United States Patent
Shimizu

(10) Patent No.: US 7,380,972 B2
(45) Date of Patent: Jun. 3, 2008

(54) LIGHTING SYSTEM AND LIQUID CRYSTAL BACKLIGHT DEVICE

(75) Inventor: Masaki Shimizu, Tochigi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/526,010

(22) PCT Filed: Aug. 19, 2003

(86) PCT No.: PCT/JP03/10458

§ 371 (c)(1),
(2), (4) Date: Feb. 25, 2005

(87) PCT Pub. No.: WO2004/020899

PCT Pub. Date: Mar. 11, 2004

(65) Prior Publication Data

US 2006/0072343 A1 Apr. 6, 2006

(30) Foreign Application Priority Data

Aug. 28, 2002 (JP) .............................. 2002-249346

(51) Int. Cl.
*F21V 21/30* (2006.01)
(52) U.S. Cl. ..................... 362/632; 362/633; 362/634; 349/59; 349/60
(58) Field of Classification Search ........ 362/632–634, 362/232, 233, 269, 285, 371, 383, 384, 393; 349/59, 60
See application file for complete search history.

(56) References Cited

U.S. PATENT DOCUMENTS

| 6,835,961 | B2* | 12/2004 | Fukayama ................... 257/84 |
| 6,846,098 | B2* | 1/2005 | Bourdelais et al. ......... 362/330 |
| 7,125,157 | B2* | 10/2006 | Fu et al. ..................... 362/632 |
| 7,198,819 | B2* | 4/2007 | Kang ......................... 427/148 |
| 2001/0006461 | A1* | 7/2001 | Okuno ....................... 362/311 |
| 2001/0055075 | A1* | 12/2001 | Wang et al. .................. 349/58 |
| 2002/0024623 | A1* | 2/2002 | Kim et al. .................... 349/58 |
| 2003/0043312 | A1* | 3/2003 | Nishida et al. ............... 349/58 |

FOREIGN PATENT DOCUMENTS

| JP | 4-315127 A | 11/1992 |
| JP | 11-84351 A | 3/1999 |

(Continued)

*Primary Examiner*—Sharon E. Payne
*Assistant Examiner*—Mary Zettl
(74) *Attorney, Agent, or Firm*—Birch, Stewart, Kolasch & Birch, LLP

(57) ABSTRACT

Luminance irregularities caused by the weight of the optical members in a backlight apparatus are reduced. A lighting apparatus comprises optical members 1 and 2, a casing in which the optical members 1 and 2 and a lamp 4 are disposed, a first member 1a formed in optical members 1 and 2, and a second member 3a formed in the casing for attaching the optical members 1 and 2 to the casing by cooperating with the first member 1a. The first and second members 1a and 3a are provided in positions such that no upward stress is applied to the optical members due to their own weights at the bottom in a vertical direction in the plane of the display screen, both in a basic position and a first stop position of the lighting apparatus, the latter position being reached by rotation of the apparatus from the basic position in the plane of the display screen.

17 Claims, 18 Drawing Sheets

FOREIGN PATENT DOCUMENTS

| | | |
|---|---|---|
| JP | 11-281966 A | 10/1999 |
| JP | 11-337942 A | 12/1999 |
| JP | 2000-206316 A | 7/2000 |
| JP | 2000-310775 A | 11/2000 |
| JP | 2000-331518 | 11/2000 |
| JP | 2001-249622 A | 9/2001 |
| JP | 2004-299481 A | 10/2004 |

* cited by examiner

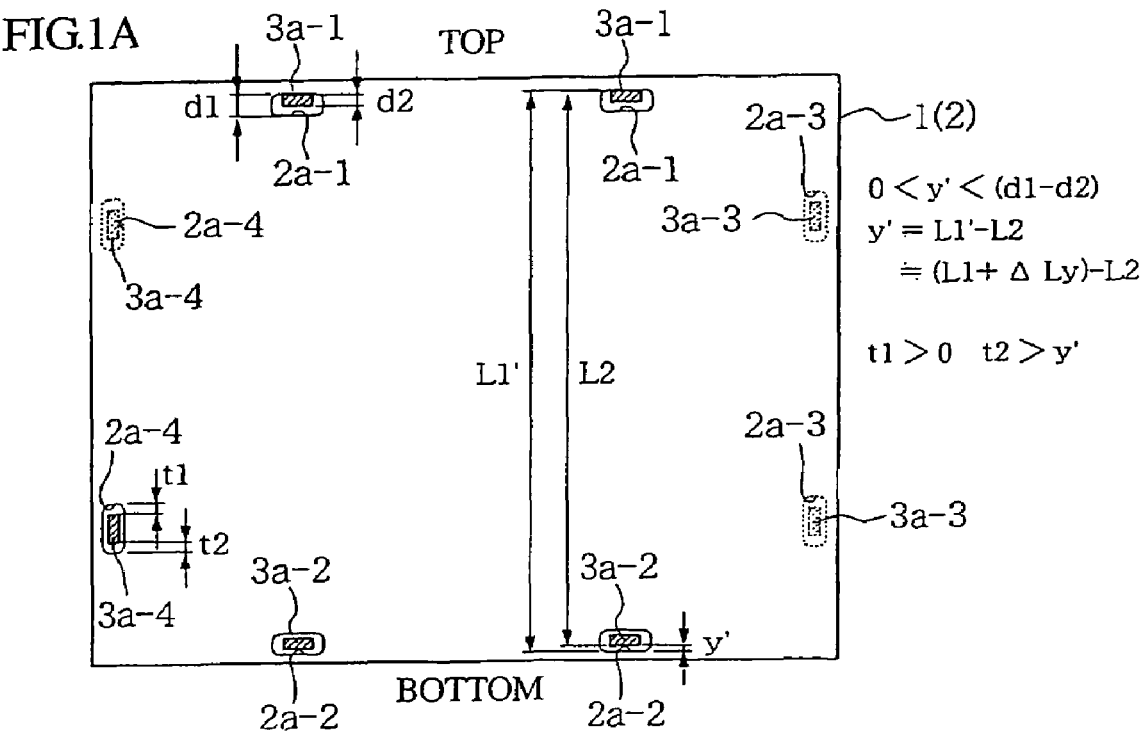
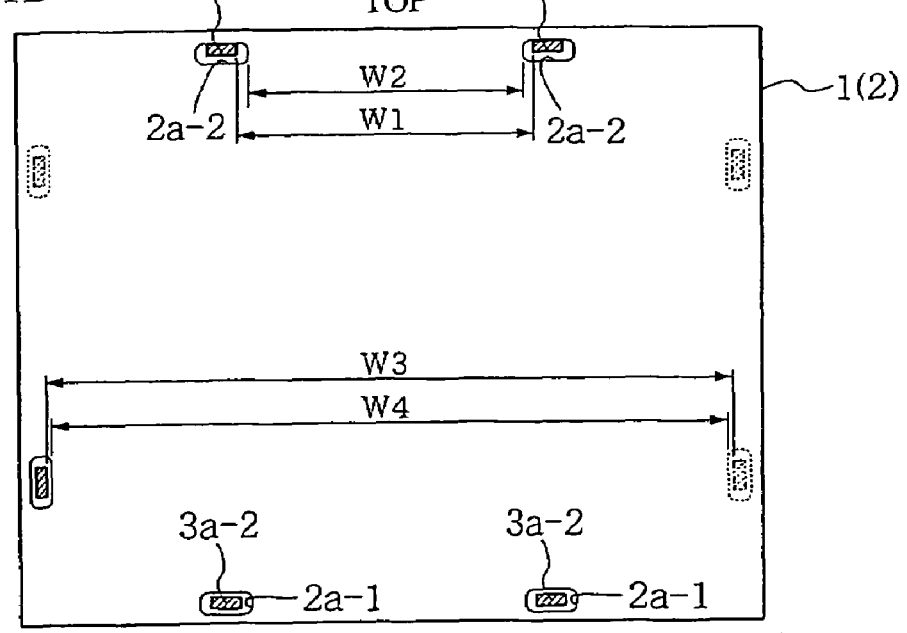

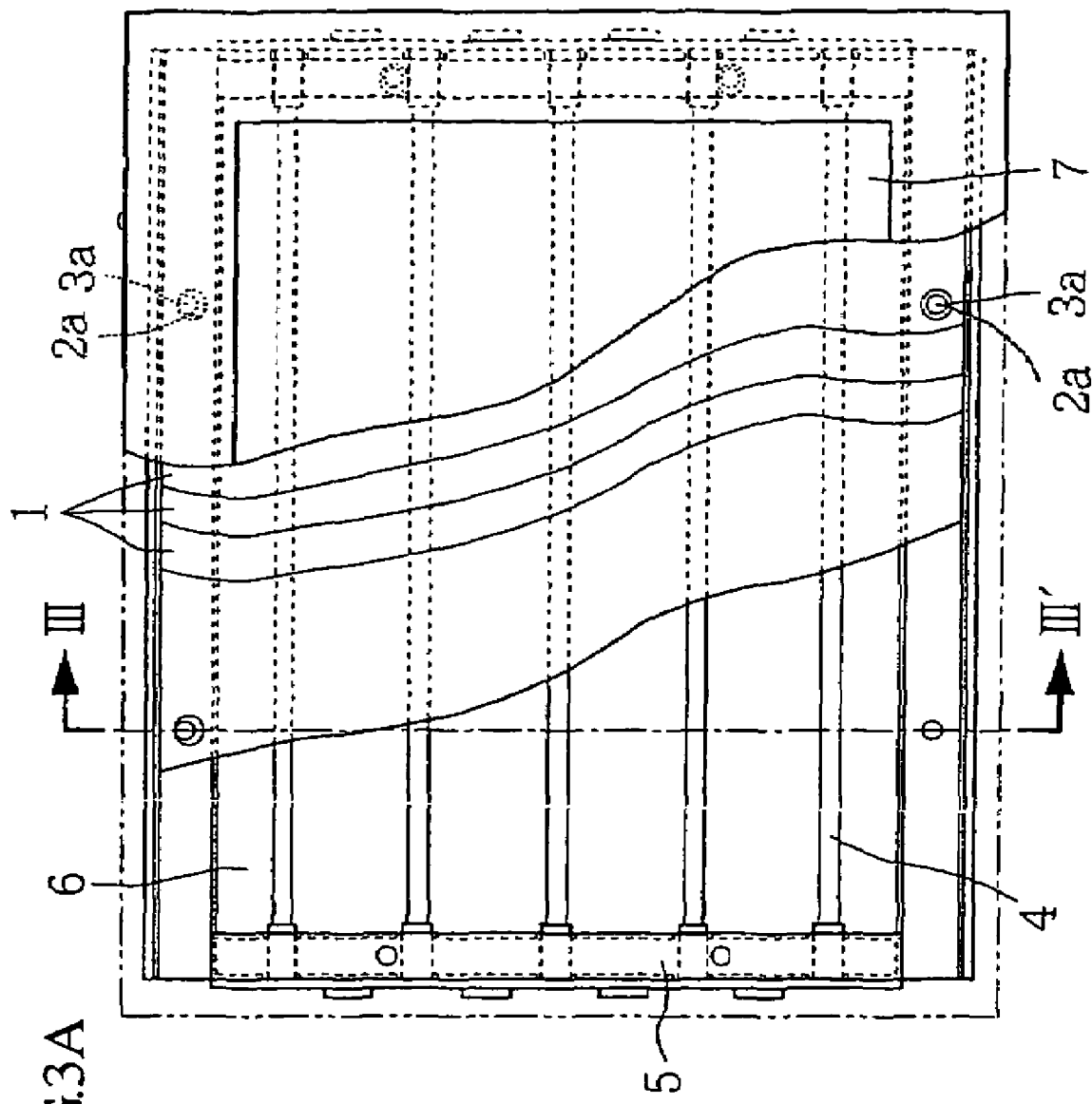
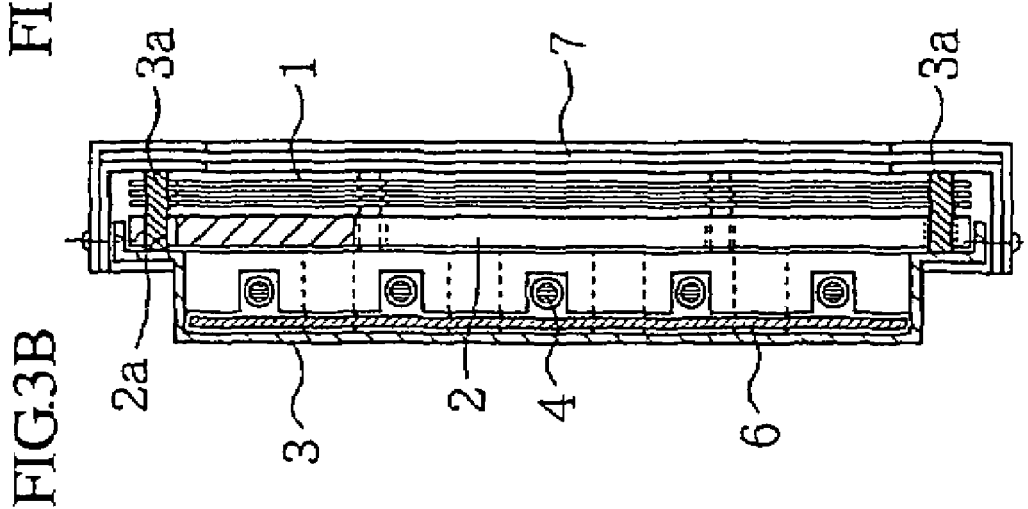

BASIC POSITION

180° ROTATION

90° ROTATION

270° ROTATION

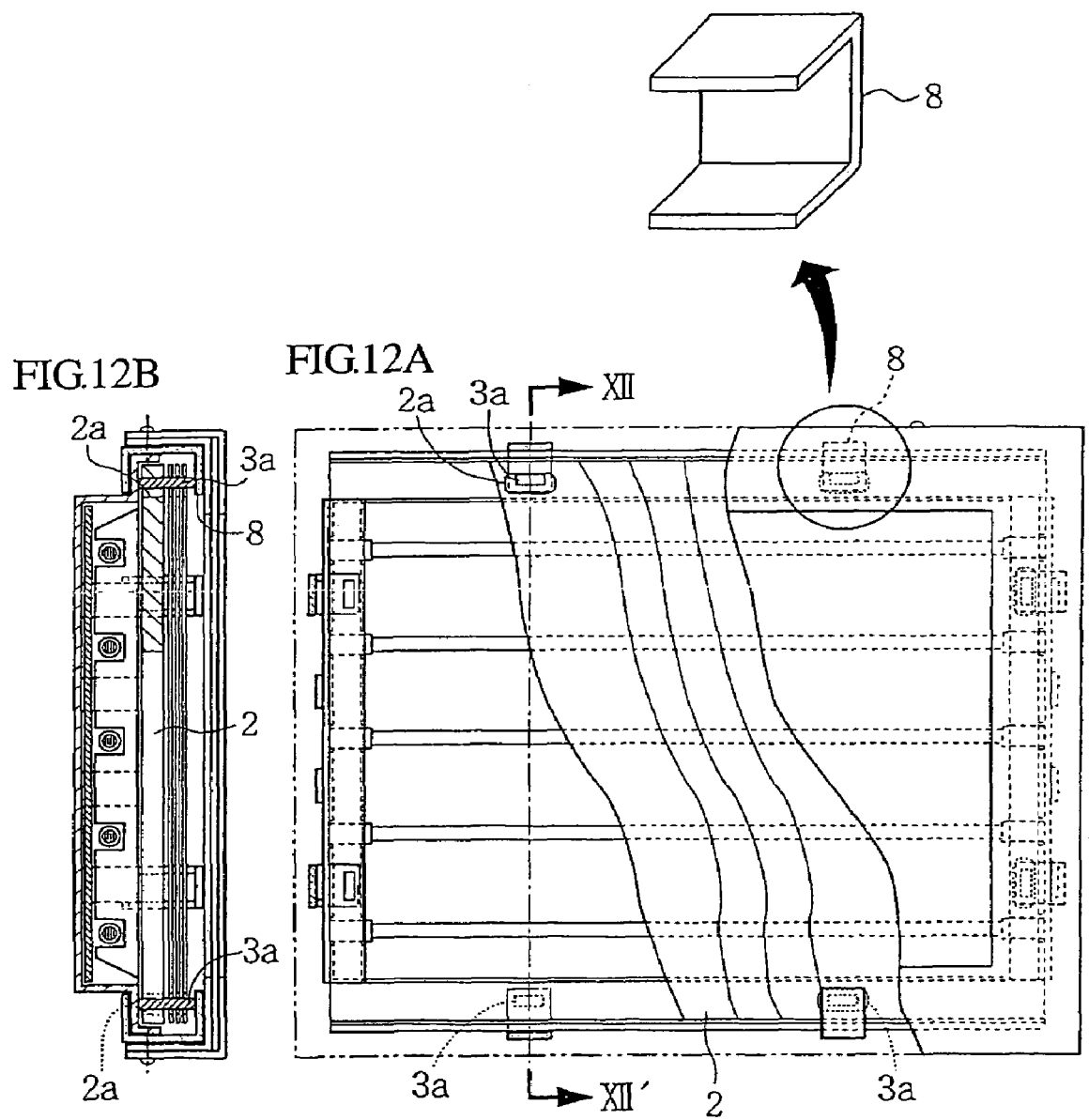

RELATIONSHIP BETWEEN THE AMOUNT OF ABSORPTION
AND TIME DURING IMMERSION IN WATER
(SUMIPEX 000 3mm)

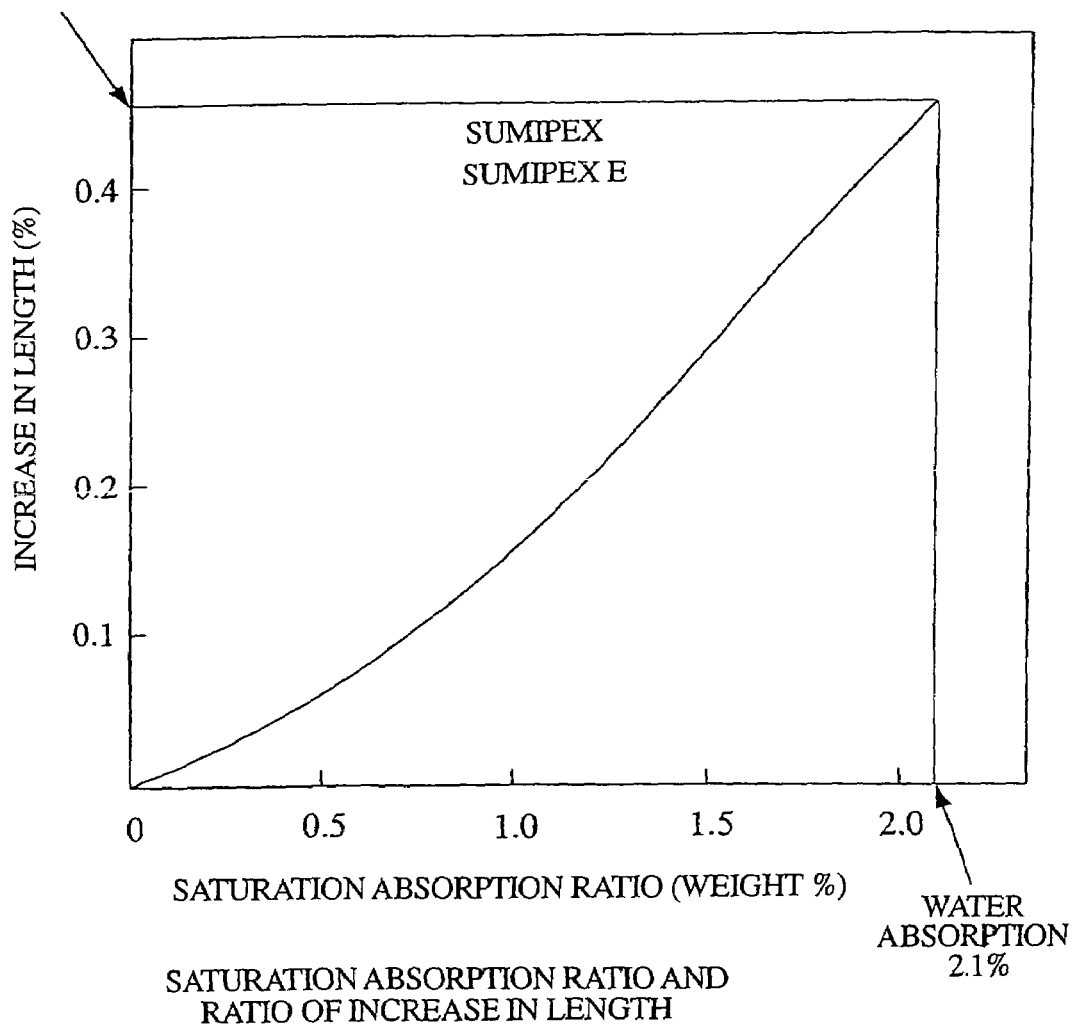

LIGHTING SYSTEM AND LIQUID CRYSTAL BACKLIGHT DEVICE

TECHNICAL FIELD

The present invention relates to a lighting apparatus and a liquid crystal display ("LCD") apparatus using the same, particularly to a backlight apparatus for large-sized LCD apparatuses.

BACKGROUND ART

Referring to FIGS. 14 and 15, in some conventional LCD backlight apparatuses, an opening 2a is provided on an upper section of optical sheets 1 and/or a diffusing plate 2 (which will be referred to as optical members) towards either side. Locking portion 3a are provided in a frame 3 at positions corresponding to openings 2a, so that the frame can support the optical members.

DISCLOSURE OF THE INVENTION

If the optical members such as optical sheets and a diffusing plate are locked with the frame merely at the upper-side portions of the screen of the LCD apparatus, problems may arise when the screen of the LCD is rotated on its normal axis (in-plane rotation), for example.

Specifically, if the display in this case is rotated in the plane of the screen and turned upside-down, the openings of optical members will be located at either side of the lower half of the screen. This can cause the optical members to be warped or curved due to their own weights, particularly when the optical members are large (for large screen sizes).

If the curving or warping of the optical members become excessive, the diffusing plate, for example, could come into contact with some parts of the LCD panel via the optical sheets. This causes heat to be transferred from the diffusing plate to the LCD panel, resulting in temperature differences on the LCD panel between where it is in contact with the diffusing panel and where it is not. These temperature differences produce unintended luminance or contrast irregularities on the LCD panel. Further, as the size of LCD apparatuses increase, such warping or curving can result in problems in the structure of the apparatus or in manufacturing processes.

It is therefore an object of the invention to provide a structure in which the warping or curving of the optical members is prevented when the display is rotated, so that display luminance irregularities can be reduced.

In one aspect, the invention provides a lighting apparatus comprising:
an optical member;
a casing in which the optical member and a lamp are disposed;
a first member provided in the optical member; and
a second member provided in the casing for attaching the optical member to the casing by cooperating with the first member, wherein
the first and second members are disposed such that both when the lighting apparatus is in a basic position and in a first stop position reached when the lighting apparatus is rotated from the basic position in the display plane, no upward stress is applied to a lower part of the optical member in the plane of the display screen due to its own weight.

The first member may be an opening (hole) formed in the optical member, for example, and the second member may be a locking projection for attaching the optical member to the casing via the opening.

In another aspect, the invention provides a lighting apparatus comprising:
an optical member;
a casing in which the optical member and a lamp are disposed;
a first member provided in the optical member; and
a second member provided in the casing for attaching the optical member to the casing by cooperating with the first member, wherein
the first and second member are disposed such that both when the lighting apparatus is in a basic position and in a first stop position reached when the lighting apparatus is rotated from the basic position in the plane of the display screen, the optical member is supported at the top in the plane of the display screen, and no upward stress is applied to the optical member at the bottom due to its own weight.

In this lighting apparatus, the optical member is prevented from being easily warped when rotated to different positions from the basic position.

Preferably, in the state where the opening or the edge of cutaway at the bottom of the non-effective screen range of the LCD apparatus does not contact the locking projection, a degree of spatial freedom is given between the opening or the edge of cutaway and the locking projection that are not locked with one another.

In another aspect, the invention provides a rotatable LCD apparatus comprising:
an LCD apparatus; and
a rotating mechanism for rotating the LCD apparatus, wherein the LCD apparatus includes an LCD backlight apparatus and an LCD panel, the LCD backlight apparatus comprising:
an optical member in which a plurality of openings or cutaways are formed above and below the center of gravity of the optical member; and
a casing in which the optical member and a lamp are disposed, the casing including a locking projection that abuts on the openings or cutaways to thereby support the optical member, and a locking projection that does not abut on the openings or cutaways, wherein the openings or the edges of the cutaways do not contact the locking projections below the center of gravity in either a basic position or in a first stop position of the LCD apparatus, the first stop position being reached as the LCD apparatus is rotated from the basic position in the plane of the optical member, wherein the LCD panel is disposed on the opposite side of the optical member from the lamp. This apparatus is capable of providing clear display in any of the rotation positions.

In a further aspect, the invention provides a lighting apparatus comprising:
an optical member; and
a casing in which the optical member and a lamp are disposed, wherein
the optical member can be locked above and below the center of gravity in a vertical direction depending on its rotation, wherein the optical member is adapted not to receive upward stress below the center of gravity. Thus, the influence of the weight of the optical members can be reduced in any of the rotation positions.

Thus, deformation such as warping or curving of the optical sheets and/or diffusing plate can be prevented in any position of the display.

BRIEF DESCRIPTION OF THE DRAWINGS

FIGS. 1(A) and (B) are drawings for the explanation of the principle of the LCD backlight apparatus according to an embodiment of the invention.

FIG. 3(A) shows a front view of the LCD backlight apparatus shown in FIG. 2, and FIG. 3(B) shows a cross-sectional view taken along line III-III of FIG. 3(A).

FIGS. 12(A) and (B) show the LCD backlight apparatus according to a third embodiment of the invention.

FIG. 18 shows the relationship between the saturation absorption and the length-increasing ratio of an optical member.

BEST MODE FOR CARRYING OUT THE INVENTION

In the present specification, when referring to the positions of the openings and locking projections, the "top" of the display screen refers to an upper part of the screen vertically above with respect to the center of gravity of the optical members. When a backlight is used in an LCD apparatus, the openings and locking projections are usually provided at the edge portions of the display screen. Therefore, the "top" usually refers to the upper or lower edges (frame edges) of the display screen. Further, in the present specification, the term "casing" includes the frame, shields, a reflecting plate, and a lamp holder. The locking projections are provided on the casing. The casing may not include a lamp.

Figure 16A:
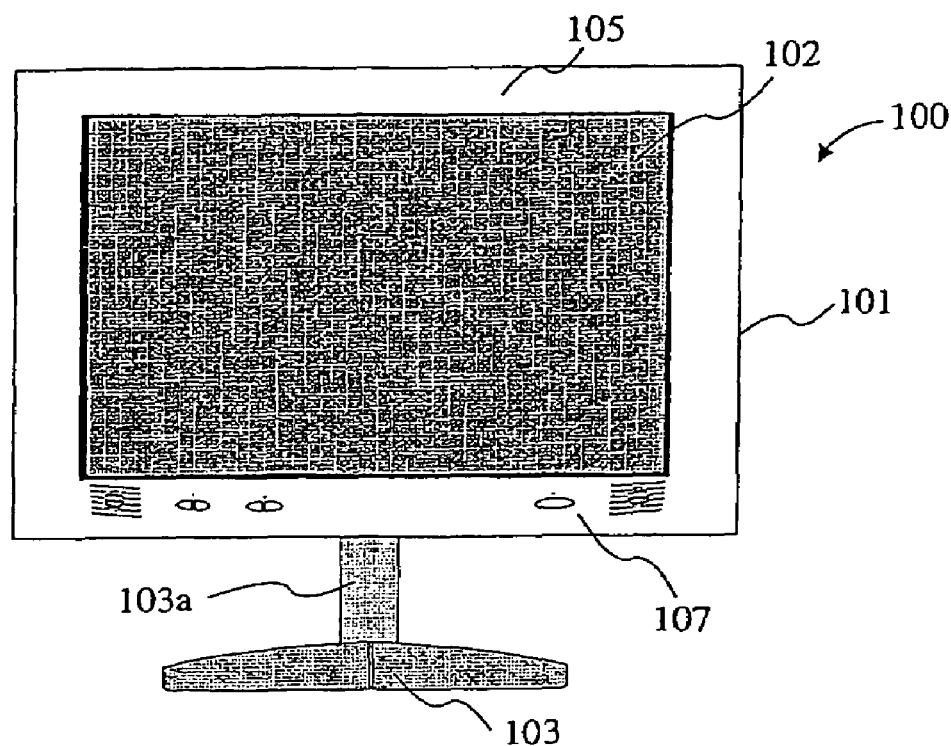
FIG. 16(A) shows a front view of an LCD television according to an embodiment of the invention.

Referring to FIGS. 16(A) and (B), a rotatable LCD television will be described. As shown in FIG. 16(A), a rotatable LCD television 100 includes a main body 101 and a stand 103. The main body 101 includes a display screen 102 and a frame 105. Various operation buttons 107 are provided in the frame 105. The main body 101 and stand 103 are connected by a support 103a.

Figure 16B:
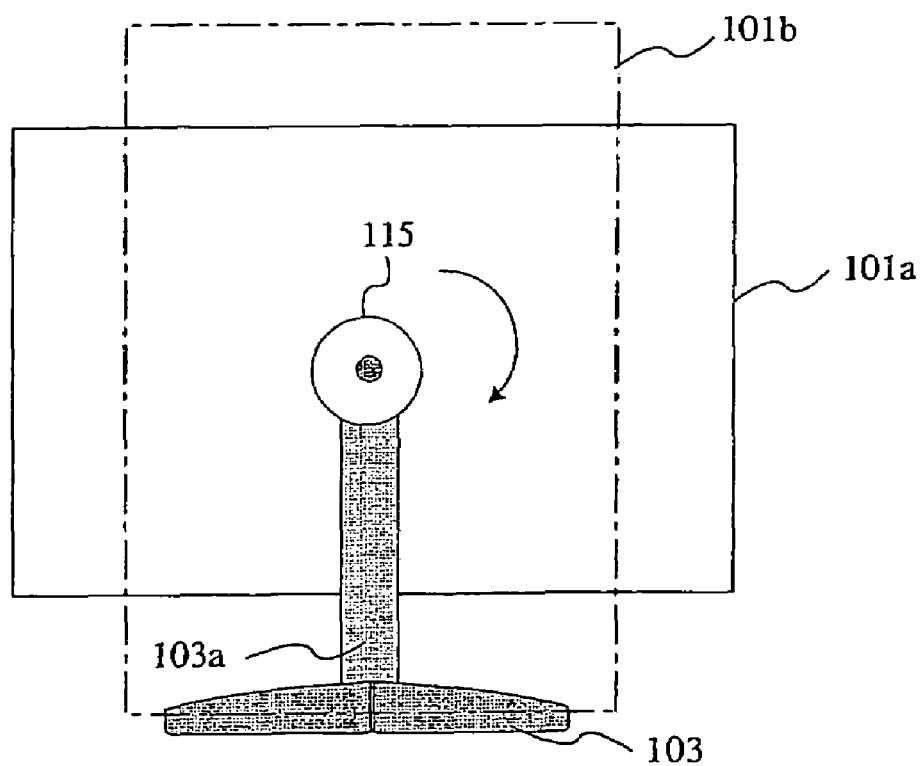
FIG. 16(B) shows a rear view of the LCD television.

As shown in FIG. 16(B), the support 103a and the main body 101 are coupled by a rotation mechanism 115 on the back of the rotatable LCD television, such that the main body 101 is rotatable in the plane of the display screen 102. The television has at least two stop positions, i.e., a first stop position 101a and a second stop position 101b, so that a viewer can watch TV on a screen which is longer in either the horizontal or vertical direction.

Before describing the embodiments of the invention, the analysis conducted by the inventors will be discussed by referring to FIGS. 1(A) and (B). In the apparatus as shown in FIG. 16, in which the LCD can be rotated so as to provide a plurality of viewing positions, the inventors recognized the need to reduce the warping or curving of the optical members at each of the stop positions so that the display irregularities could be reduced.

Referring to FIG. 1(A), a total of four openings, namely openings 2a-1 (two at the top) and openings 2a-2 (two at the bottom), are provided in the optical members (including optical sheets) attached to the frame (not shown). Locking projections 3a-1 for supporting the optical members 1 are provided on the frame such that they can be freely fitted into the openings 2a-1.

Both before and after rotation of the LCD apparatus by 180° in the plane of the display screen as shown in FIG. 1B (the position prior to rotation, as shown in FIG. 1(A), is the default position and will be referred to as the "basic position" hereafter), it is desirable that two conditions be met. Condition 1 is that, of the openings 2a-1 or 2a-2 and locking projections 3a-1 or 3a-2, the openings and the locking projections located at the top be positioned relative to one another such that an upper edge portion of each opening abut (is locked by) an upper periphery portion of a corresponding locking projection. A second (subordinate) condition is that the openings a corresponding locking projection at the bottom be positioned relative to one another such that the upper peripheral portion of each locking projection does not abut the upper edge of a corresponding opening (a "freely fitted state") in the normal range of use, or that it abuts but only to such an extent that no warping or curving would be caused in the optical members due to the stress applied to the optical members in a vertically compressing direction. As the optical members such as optical sheets and the diffusing plate are subject to thermal expansion due to temperature increases, it is desirable that conditions 1 and 2 be met even in the event of thermal expansion.

The viewer may wish to rotate the LCD apparatus by 90° in the display plane. To allow for such cases, the optical members are provided with openings 2a-3 and 2a-4 at four locations along the vertical sides of the members. Likewise, the frame is provided with four locking projections 3a-3 and 3a-4 for supporting the optical members. Both before and after rotation by 90° or 270°, it is desirable that the upper edge of each of openings 2a-3 or 2a-4 abuts on the periphery of a corresponding locking projection 3a-3 or 3a-4 at the top, to satisfy condition 1. It is also desirable that the openings and locking projections at the bottom not abut on each other but rather be in a freely fitted state in the normal range of use of the LCD apparatus, or they abut on each other but only to such an extent that no warping or curving would be caused in the optical members, thereby satisfying condition 2. Desirably, both conditions 1 and 2 should be satisfied even in the event of thermal expansion of the optical sheets or diffusing plate due to temperature rises.

The number and positions of the openings and locking projections may vary depending on the degree to which the LCD apparatus is expected to be rotated.

Still referring to FIGS. 1(A) and (B), the positional relationships between the openings and locking projections will be described in more detail, by referring to an example of an LCD backlight apparatus. As the process of deformation differs between the optical sheets 1 and the diffusing plate 2, their design values must also be varied to accomodate the deformation. However, they can be considered similar in terms of positional relationships between locking projections and openings. Thus, the openings formed in the optical members such as the optical sheets 1 and diffusing plate 1 and the locking projections should have the following relationships. Namely, when providing play between the openings and the locking projections, the amount of elongation of the diffusing plate or optical sheets and the condition concerning the locking at the top of a non-effective screen range of the LCD apparatus should be considered.

The distance between the upper and lower edges of an opening will be referred to as d1, and the distance (thickness) between the upper and lower peripheries of a locking projection will be referred to as d2. The diffusing plate 2 is mounted on the frame 3 as the upper edge of opening 2a-1 abuts the upper periphery of locking projection 3a-1 that has been inserted into the opening. A distance y' between the lower edge of opening 2a-2 and the lower periphery of locking projection 3a-2 is expressed by:

$$y' = L1 - L2$$

where L1 is the distance between the upper edge of opening 2a-1 at the top and the lower edge of opening 2a-2 at the bottom, and L2 is the distance between the upper periphery of locking projection 3a-1 at the top and the lower periphery of locking projection 3a-2 at the bottom.

Under these definitions, a case will be considered in which the diffusing plate 2 has extended to a maximum in the normal range of use of the LCD apparatus (involving the generation of heat by keeping the lamp on for a long time), in view of the thermal expansion property of the diffusing plate 2, for example. In this case, the distance between the upper edge of opening 2a-1 at the top and the lower edge of opening 2a-2 at the bottom will be designated as L1'. The amount of play ymax can be expressed by ymax=L1'-L2. There should be a degree of freedom such that the diffusing plate 2 can be moved by the amount of play ymax when the backlight set is turned upside-down. This condition can be expressed by $$0 < y\max < (d1-d2) \quad (9\text{-}1)$$

$$y\max = L1'\text{-}L2 = L1 + \Delta Ly\text{-}L2 \quad (9\text{-}2)$$

where $\Delta Ly$ is the maximum amount of elongation in the distance between the upper edge of opening 2a-1 at the top and the lower edge of opening 2a-2 at the bottom.

From expressions (9-1) and (9-2), L1-L2=ymax-$\Delta Ly$<d1-d2-$\Delta Ly$, which gives $$L1\text{-}L2 < d1\text{-}d2 - \Delta Ly \quad (9\text{-}3)$$

Thus, it is necessary to make the difference between d1-d2 and $\Delta Ly$, which is the decrease in d1-d2 when elongation is taken into account, larger than L1-L2 prior to elongation.

Hereafter, the positional relationships between openings 2a-3 and 2a-4 located on the left and right sides of the diffusing plate 2 and corresponding locking projections 3a-3 and 3a-4 will be described. Two of these positional relationships in the vertical and horizontal directions should be considered. With regard to the vertical direction, play between the openings 2a-3 and 2a-4 and the locking projections 3a-3 and 3a-4 on the left and right sides should be taken to be wider than ymax. This can be expressed by $$t2 > y\max = L1'\text{-}L2 = (L1\text{-}L2) + \Delta Ly \quad (9\text{-}4)$$

where t2 is the distance between the bottom edge of each opening 2a-3 or 2a-4 and the bottom edge of a corresponding locking projection 3a-3 or 3a-4 when the diffusion plate has been elongated to the greatest extent.

With regard to the horizontal direction, play in the vertically adjacent openings (2a-3 and 2a-3, or 2a-4 and 2a-4) and play in the horizontally opposite openings (2a-3 and 2a-4) should be designed by taking the elongation of the diffusing plate 2 into consideration. As shown in FIG. 1(B), this can be expressed by $$W1\text{-}W2 > \Delta Wx(W1) \approx \Delta Wx(W2) \quad (9\text{-}5)$$

$$W3\text{-}W4 > \Delta Wx(W3) \approx \Delta Wx(W4) \quad (9\text{-}6)$$

where W1 is the distance between the inner sides of the adjacent locking projections at the top (or bottom) in a normal state, W2 is the distance between the inner sides of the adjacent openings at the top (or bottom) in a normal state, W3 is the distance between the inner sides of the horizontally opposite locking projections in a normal state, W4 is the distance between the inner sides of the horizontally opposite openings in a normal state, and $\Delta Wx(Wn)$ is the maximum amount of elongation in length Wn (n=1, 2, 3, or 4).

The positional relationship between the openings of the diffusing plate 2 and the locking projections 3 can be designed based on expressions (9-3) to (9-6). Positional relationships can be similarly calculated for a 90° rotation of the LCD apparatus (backlight) in the display plane. The optical sheets can also be designed in the same manner as for the diffusing plate 2.

Hereafter, an example of the method of calculating the amount of elongation of the diffusing plate $\Delta L$ will be described. In this example, the elongation of the diffusing plate of a direct backlight in a 20-inch LCD apparatus will be considered. The diffusing plate of the direct backlight for 20-inch size measures 400 mm×300 mm×2.0 mm. Four openings are provided in the diffusing plate, two at the top and two at the bottom. The interval between the horizontally opposite openings is 200 mm. The following data is based on a technical data booklet "SMIPEX" compiled by Sumitomo Chemical Co., Ltd., Methacrylates and Optical Product Division.

In general, plastics materials expand against heat, and the higher the temperature, the greater the expansion. Accordingly, this property must be considered when designing the positions of the openings in the diffusing plate 2. If there is not enough spatial degree of freedom (gap) between the diffusing plate 2 and the locking projections at room temperature, the interval between the left and right openings in the diffusing plate 2 becomes larger. If this interval becomes greater than the interval between the left and right locking projections, the openings would come into contact with the locking projections and the diffusing plate 2 could even be deformed (such as by warping). Thus, the gap (play) between the openings in the diffusing plate 2 and the locking projections should be calculated in the following manner.

In general, the ease with which plastics expand due to temperatures is expressed by linear expansion coefficient (unit: $10^{-5}/°$ C.). Assuming that the linear expansion coefficient is constant with respect to temperature, and that the linear expansion coefficient of acrylic materials is about 7.0, the temperature around the diffusing plate becomes 60° C. at maximum, considering the temperature range of the LCD panel in use. In light of these temperature environments, the extension in the interval between the left and right openings in the diffusing plate at room temperature can be calculated as follows:

(Extension in the diffusing plate)=(linear expansion coefficient)×[(temperature around the diffusing plate)−(room temperature)]×(length at room temperature)

Specifically, $\Delta L = (7.0 \times 10^{-5}/°$ C.$) \times (60°$ C.$-20°$ C.$) \times (20$ cm$) = 5.6 \times 10^{-3}$(cm)$\sim 0.6$ mm.

Thus, it can be estimated that the interval between the two openings in the diffusing plate 2 would expand by about 0.6 mm horizontally. Accordingly, by providing an interval between the locking projections and the openings such that they do not abut on each other in the event of expansion of the diffusing plate 2 by about 0.6 mm horizontally, the warping of the diffusing plate 2 due to its thermal expansion causing the openings to abut on the locking projections, which in turn press the edge of the openings, can be prevented. Similar calculations can be made regarding the vertical direction. In reality, temperature tests can be conducted using actual samples so that the warping of the optical members can be reliably prevented. The warping of the optical members due to heat expansion of the diffusing plate or the like can be prevented by estimating the necessary gap between the openings and locking projections at the design stage.

Figure 2:
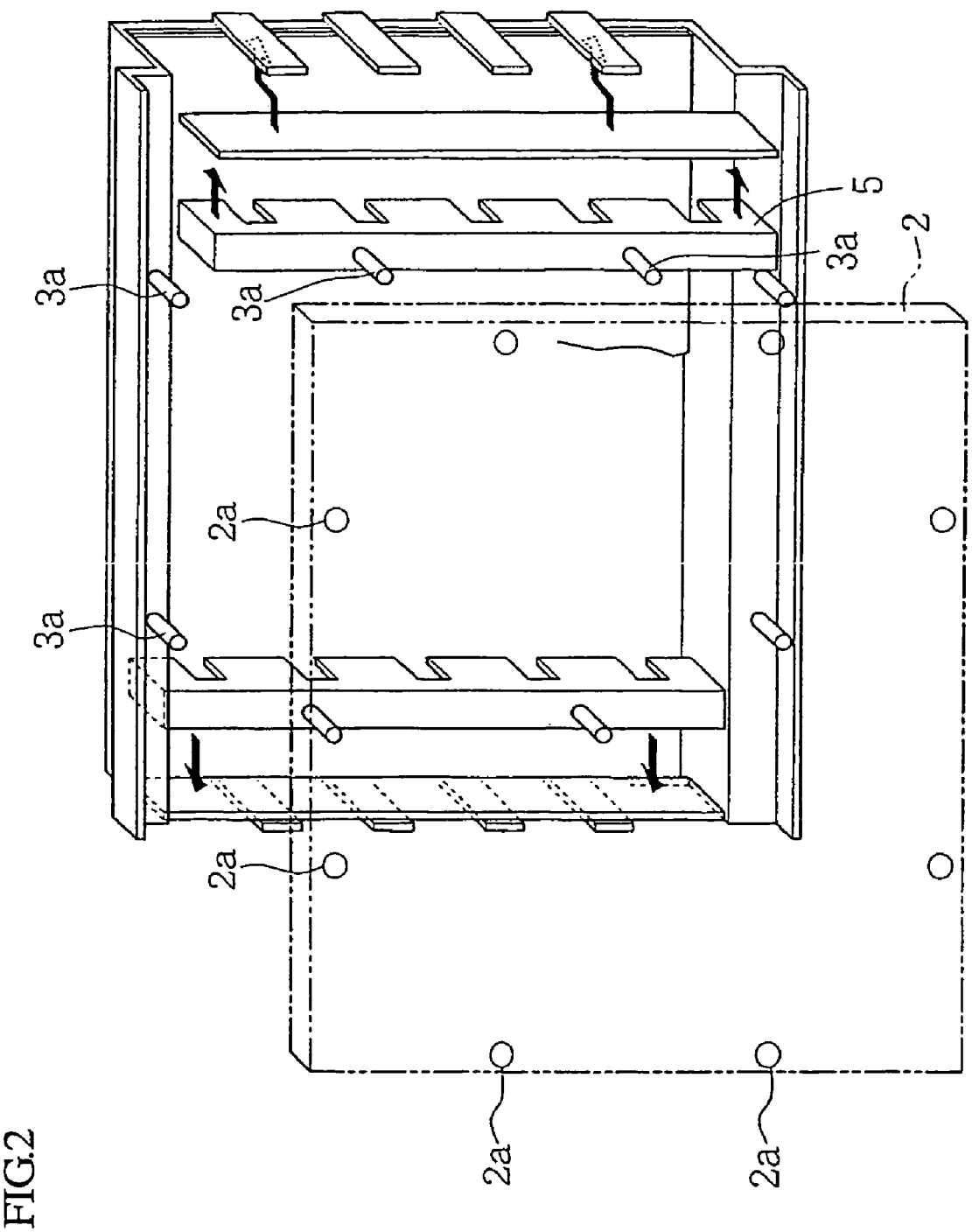
FIG. 2 shows a broken perspective view of the LCD backlight apparatus according to a first embodiment of the invention.

In the following, a direct LCD backlight apparatus according to a first embodiment of the invention will be described by referring to FIGS. 2 to 3(B) illustrating the structure of the apparatus. FIG. 2 is an exploded perspective view of the direct LCD backlight apparatus. FIG. 3(A) is a partially cutaway front view of the structure of the optical sheets and diffusing plate. FIG. 3(B) is a cross section taken substantially along line III-III' of FIG. 3(A), showing the structure including the diffusing plate, optical sheets, LCD panel, and a frame fixing the LCD panel in place.

As shown in FIGS. 2 to 3(B), the backlight apparatus includes various optical sheets 1, a diffusing plate 2, a shield 3, a lamp 4, a lamp holder 5, a reflecting plate 6, and an LCD panel 7. The optical sheets 1 and the diffusing plate 2 are provided with openings 2a (at 8 locations each on the optical sheets and the diffusing plate) in the peripheral, non-effective display-screen portions thereof. The shield 3 and the lamp holder 5 are provided with locking projections 3a at locations corresponding to the openings 2a such that the locking projections can enter the openings 2a. Preferably, the locking projections 3a may be provided in the side portions of the shield 3 instead of or together with the lamp holder 5.

The positional relationships between the locking projections 3a and the openings 2a are designed such that at least the openings 2a and locking projections 3a at the bottom do not abut on each other, or such that they abut only to an extent that neither the optical sheets 1 nor the diffusing plate 2 warp. In this way, the warping or deformation of the optical sheets 1 or diffusing plate 2 due to their own weight, for example, can be prevented. If one or both of the optical sheets 1 and the diffusing plate 2 are locked at the bottom of the display, the point of application of force in the event of deformation of the optical sheets 1 or diffusing plate 2 by their own weights would be at the locked position. This would cause the reaction force to be applied above the point of support, namely the screen as a whole, resulting in deformation such as warping.

Conversely, the higher the location of the locking projections for supporting the optical members, the narrower the region influenced by the reaction force, i.e., the region above the locking positions, would be, so that the deformation of the optical members due to their own weights would become less likely. In particular, when the optical sheets 1 or diffusing plate 2 are locked at the openings formed in a non-effective screen region, little warping occurs in the optical members due to their own weights even when the area of the display screen is increased.

Figure 4A:
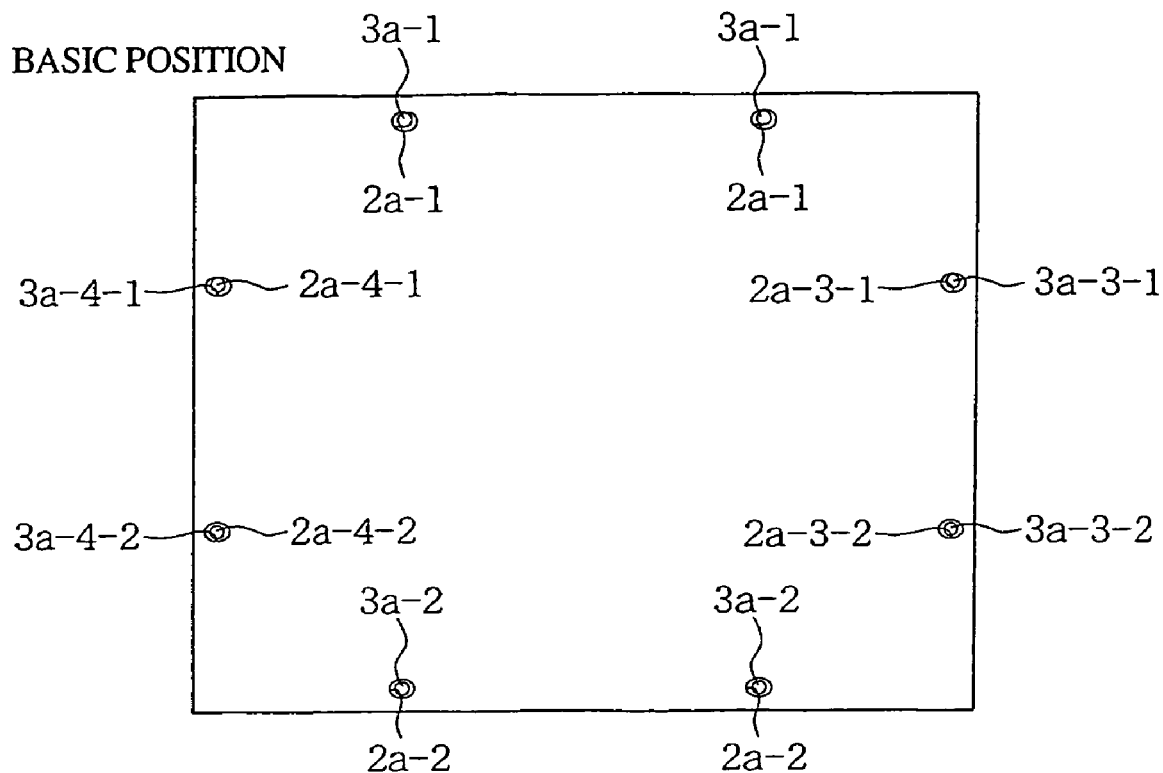
FIGS. 4(A) and (B) show the LCD backlight apparatus according to the first embodiment of the invention as it is rotated to various angles.
Figure 4B:
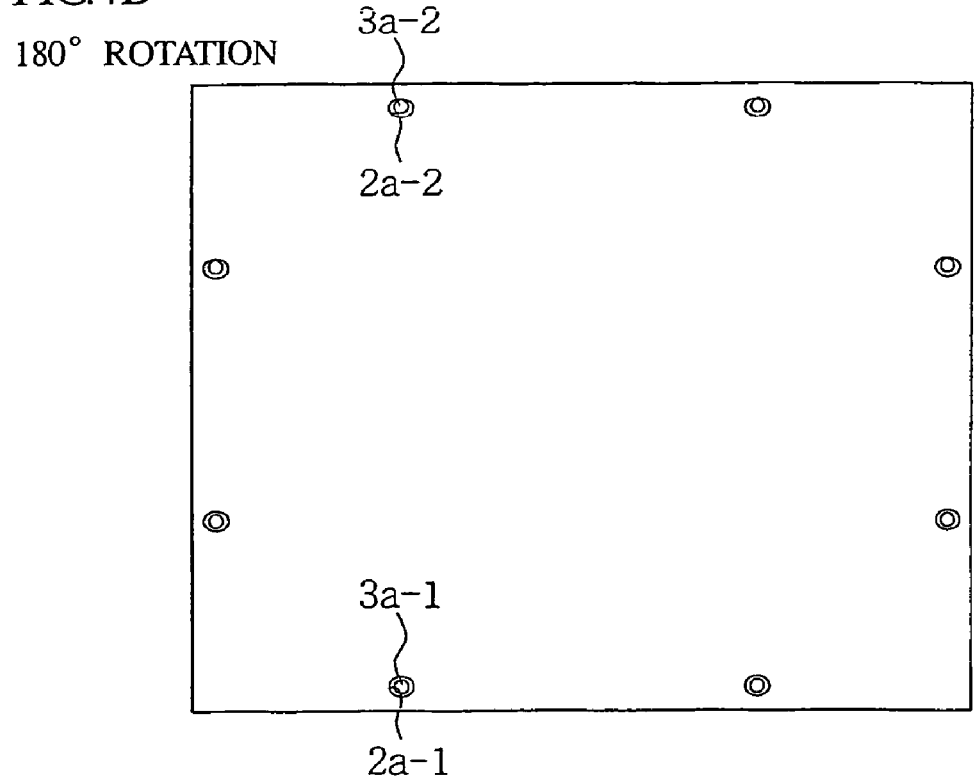
Figure 5A:
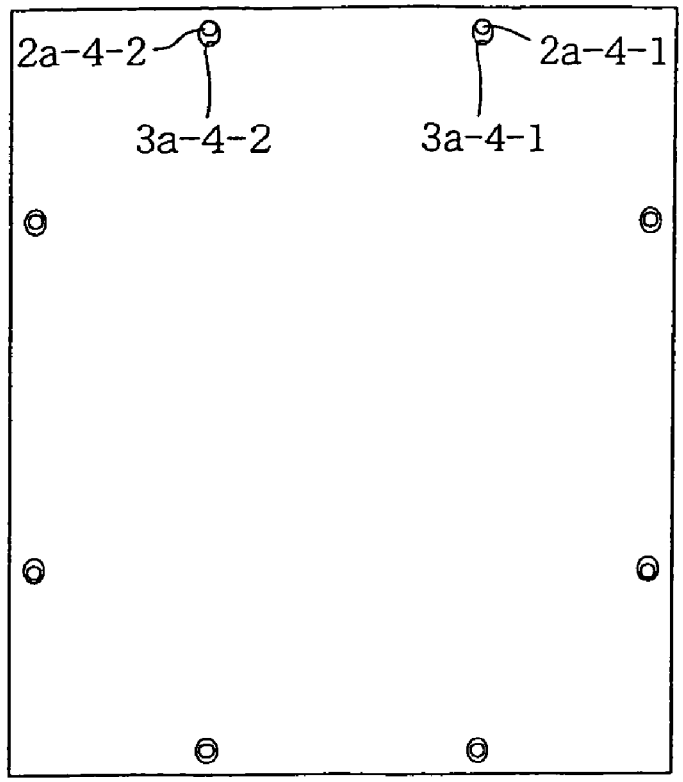
FIGS. 5(A) and (B) show the LCD backlight apparatus according to the first embodiment of the invention as it is rotated to various angles.
Figure 5B:
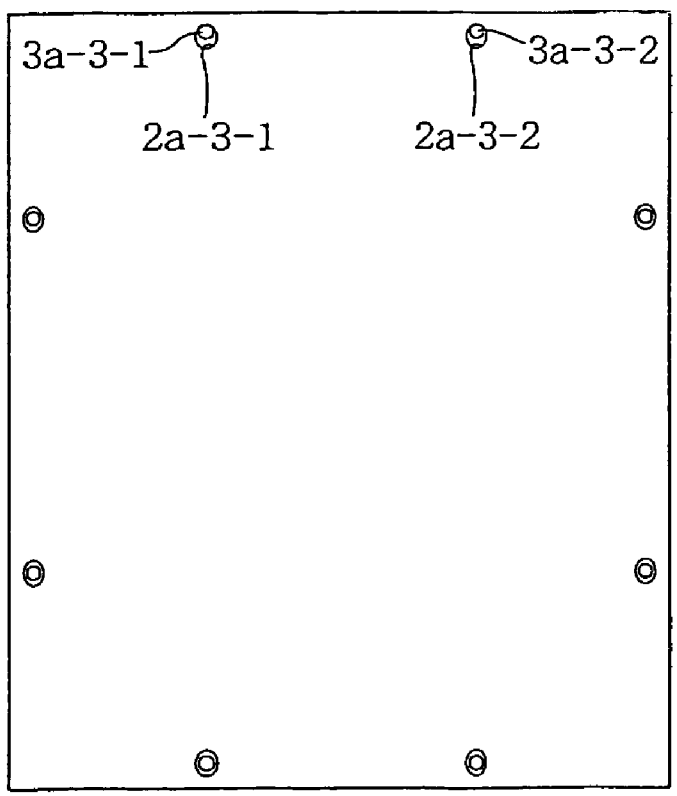

FIGS. 4 and 5 show the positional relationships between the openings in the optical members and the locking projections as the LCD backlight apparatus is rotated in the display plane. Hereafter, the positional relationships between the openings and the locking projections will be considered as the LCD backlight apparatus is rotated by 180° (turned upside-down) as shown in FIG. 4(B) from the basic position shown in FIG. 4(A), by 90° clockwise as shown in FIG. 5(A), and by 270° clockwise as shown in FIG. 5(B). In any of these cases, it is desirable that the upper edge of each opening abuts that of each corresponding locking projection at the top, while the edge of each opening and the corresponding locking projection at the bottom do not abut on each other or they abut but only to such an extent that the optical members would be hardly pressed. In this way, the optical members can be prevented from warping at each of the 90°, 180°, and 270° rotational positions.

For example, in the basic position shown in FIG. 4(A), the openings 2a-2 at the bottom are freely fitted with the locking projections 3a-2, which is true in any of the 180° position in FIG. 4(B), 90° position in FIG. 5(A), and 270° position in FIG. 5(B).

In the LCD backlight apparatus shown in FIGS. 2 to 5, each side is provided with two openings. Preferably, however, the number of openings on each side may be increased or decreased depending on the length of each side of the optical sheets 1 or diffusing plate 2, or depending on locking stability. For example, each side may be provided with a single opening.

Figure 6:
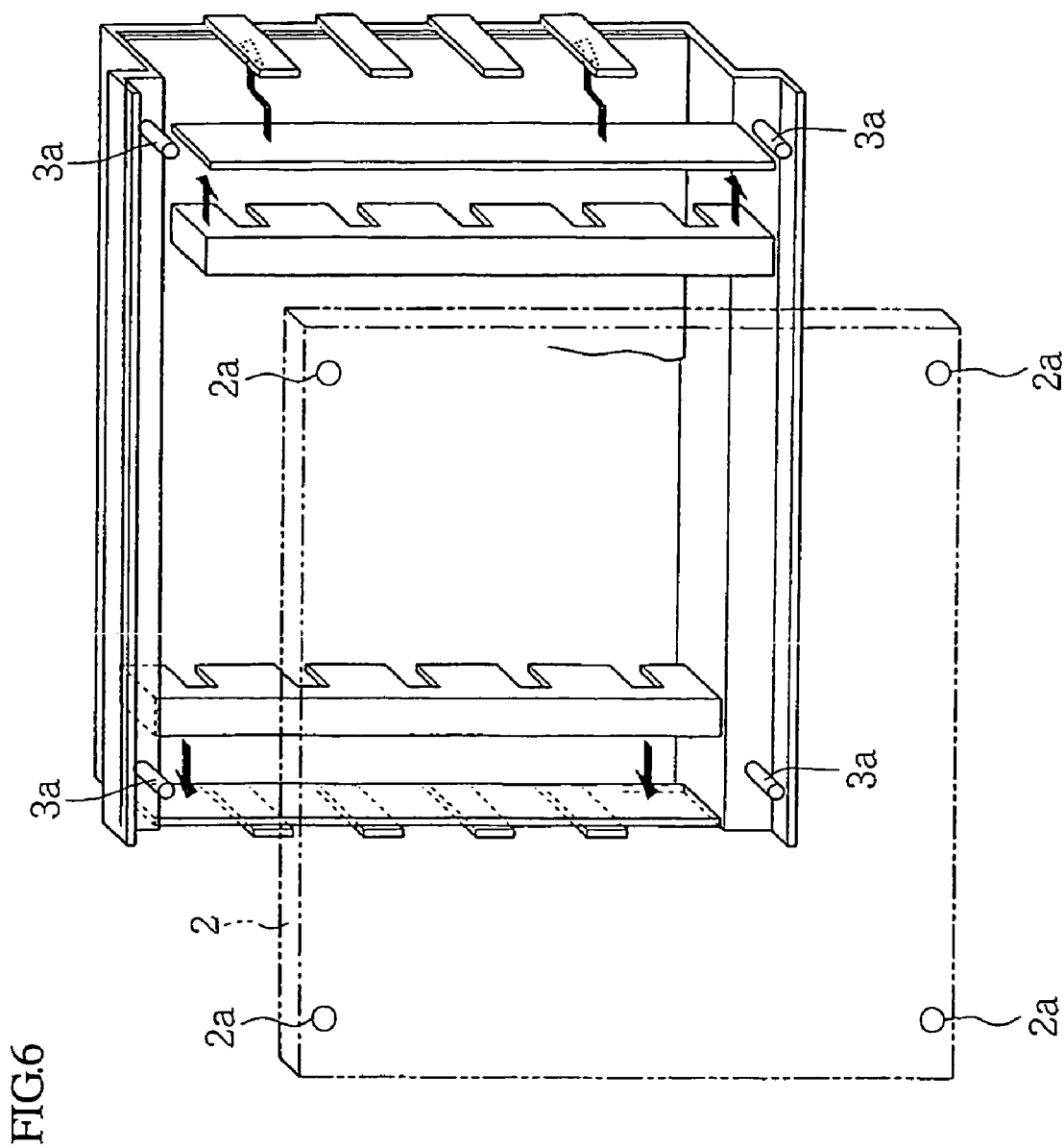
FIG. 6 shows a broken perspective view of a first variation of the first embodiment of the invention.
Figure 7A:
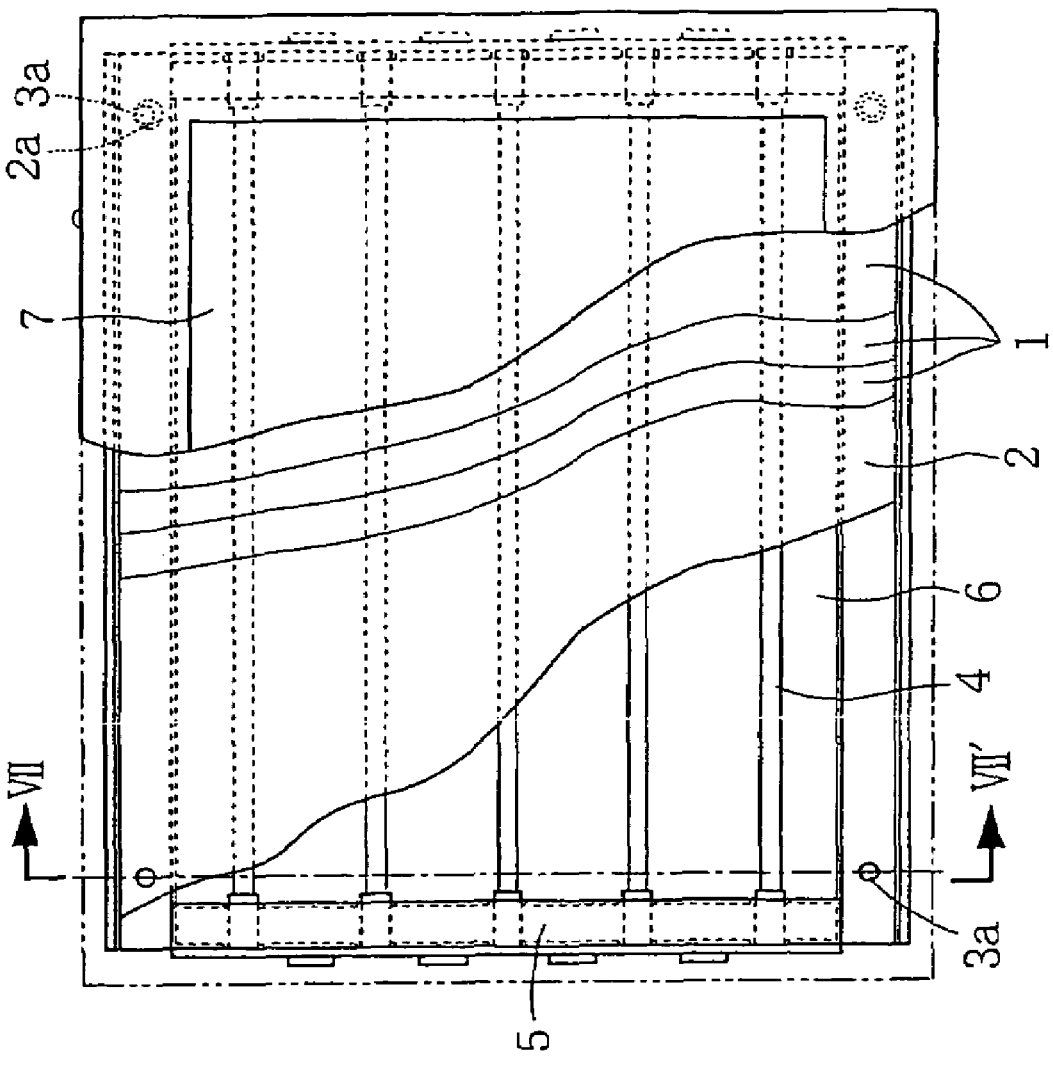
FIG. 7(A) shows a front view of the LCD backlight apparatus of FIG. 6.
Figure 7B:
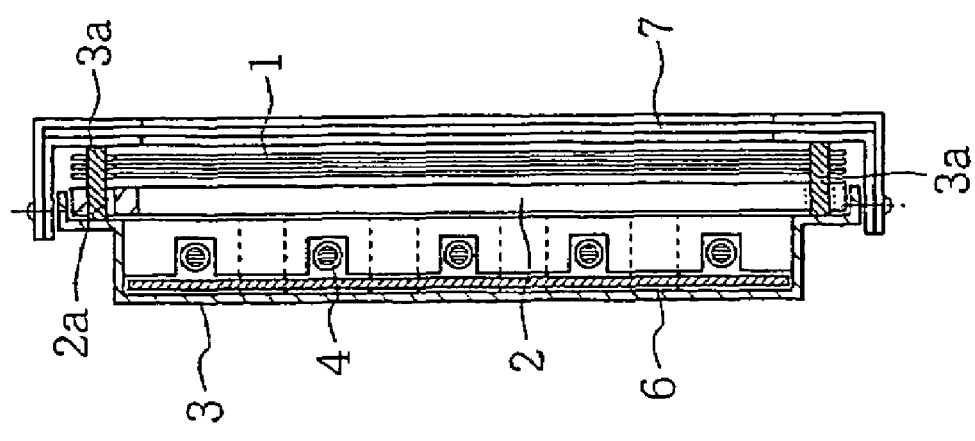
FIG. 7(B) shows a cross-sectional view taken along line VII-VII of FIG. 7(A).

Next, a variation of the first embodiment of the invention will be described by referring to FIGS. 6(A) to 7(C), which correspond to FIGS. 2 to 3(B). In this variation, the LCD backlight apparatus is provided with one opening 2a and one locking portion 3a in each corner thereof. In this configuration, as shown in FIGS. 6 to 7(B), each side has an opening 2a on either end, so that only four openings 2a are required in the diffusing plate of the rectangular LCD backlight apparatus, thus reducing the number of openings and locking projections. Yet in this simplified embodiment with less openings, the number of locking locations at any particular stop position does not change from the first embodiment.

Figure 8:
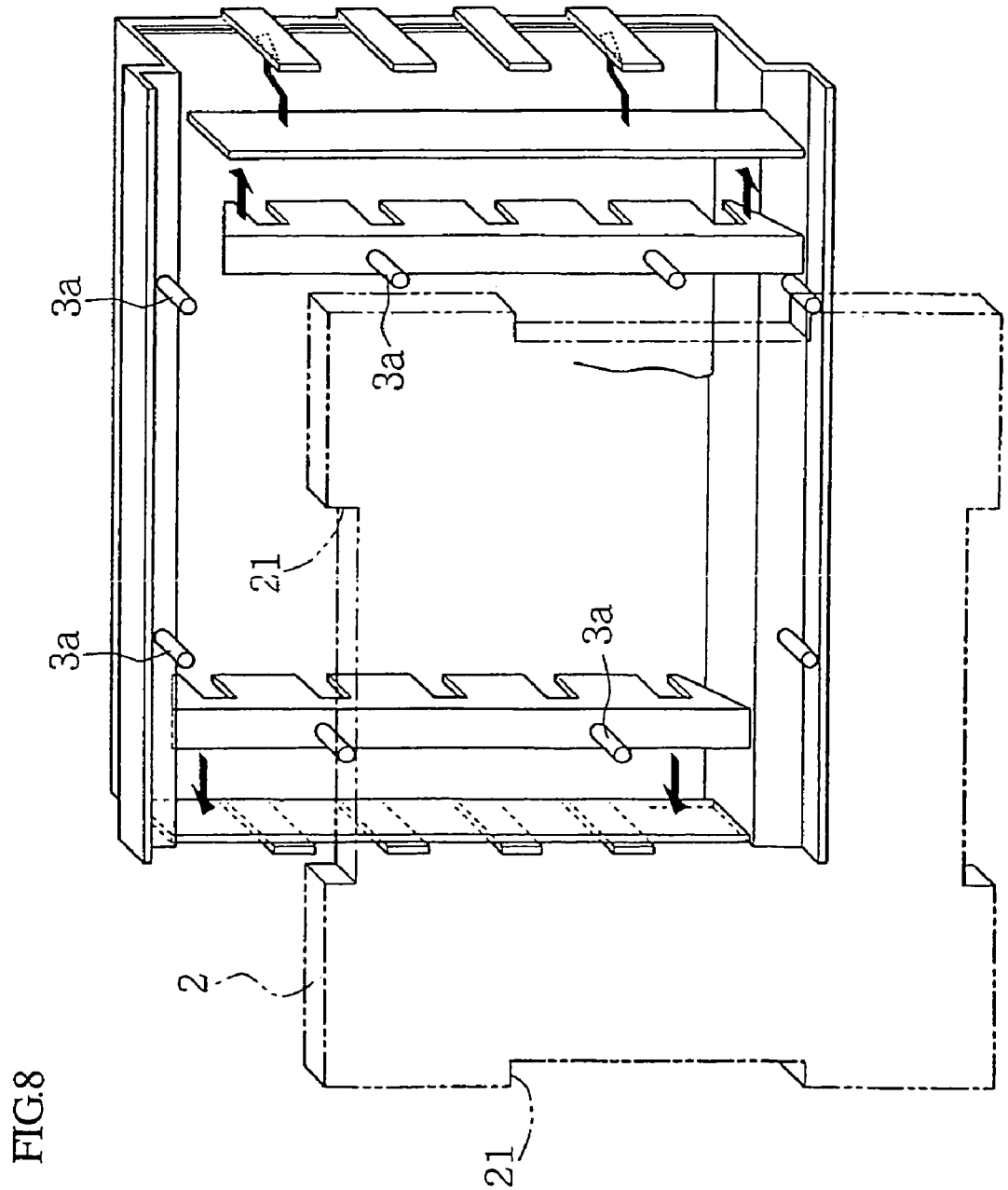
FIG. 8 shows a broken perspective view of the LCD backlight apparatus according to a second variation of the first embodiment of the invention.
Figures 9A, 9B:
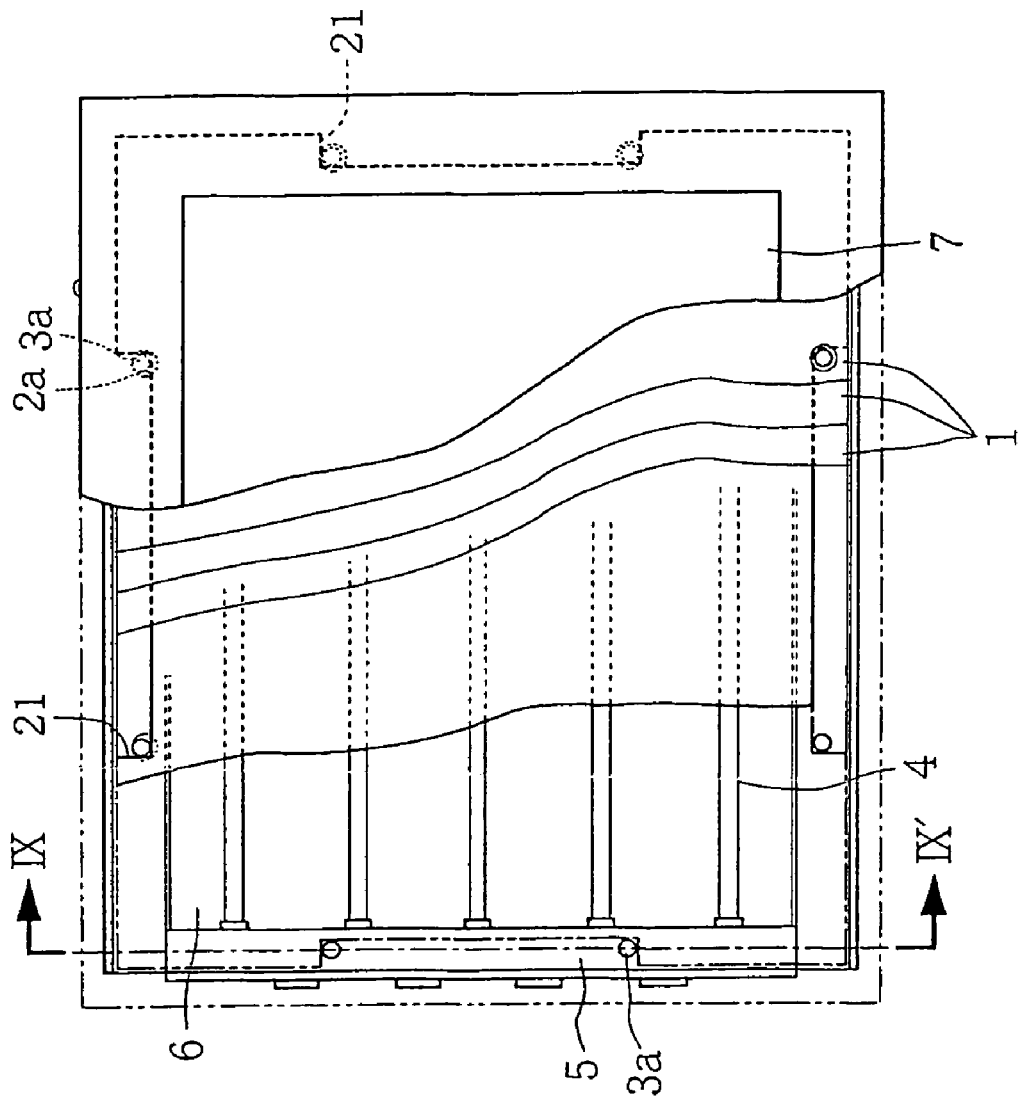
FIG. 9(A) shows a front view of the LCD apparatus of FIG. 8.
FIG. 9(B) shows a cross-sectional view taken along line IX-IX of FIG. 9(A).

Hereafter, a second variation of the first embodiment of the invention will be described by referring to FIGS. 8 to 9(B). As shown in FIGS. 8 to 9(B), two locking projections are provided in each of the four sides of the substantially rectangular frame and/or lamp holder, for a total of 8 locking projections. On the other hand, the diffusing plate 2 is provided with a cutaway portion 21 on each of the four sides thereof, each cutaway portion having a width substantially corresponding to the distance between the outer edges of the two locking projections 3a on each side of the frame or lamp holder. Thus, while the optical sheets 1 are formed with openings 2a, the diffusing plate 2 is formed not with openings but with the cutaway portions 21 along each side. The frame and the diffusing plate are united as the periphery of each locking projection 3a abuts each end of the cutaway portions 21. While in reality the lockable cutaway portions are provided at two locations in each side of the non-effective screen region, one may preferably be provided for each side if this does not influence the deformation of the optical sheets 1 or diffusing plate 2.

In the present variation, the optical members are supported by the upper edges of the cutaways on the left and right sides thereof abutting the locking projections, instead of their being supported at the top of the non-effective screen region. However, there is a possibility that, when the cutaway portions are provided on the left and right sides at about the height of the center of the display, warping might occur in the optical sheets 1 or diffusing plate 2 above the locking positions due to their own weight, particularly when the size of the display is large, as described above. To prevent this, the length of the cutaway in each side is extended in this variation, and the locking projections are positioned at either end of the cutaway. In this way, the warping of the optical members at the top can be minimized.

Figure 10:
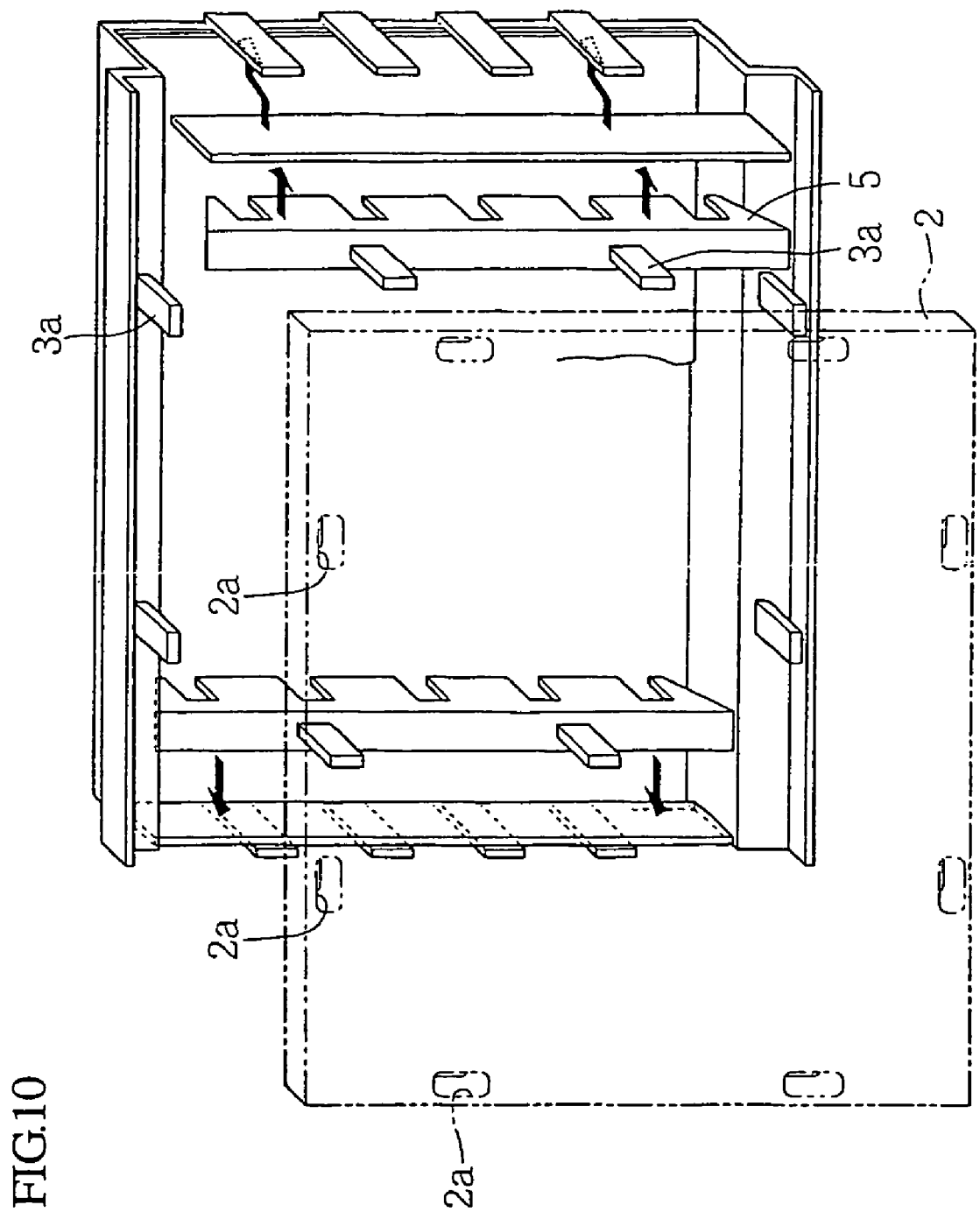
FIG. 10 shows a broken perspective view of the LCD backlight apparatus according to a second embodiment of the invention.
Figure 11A:
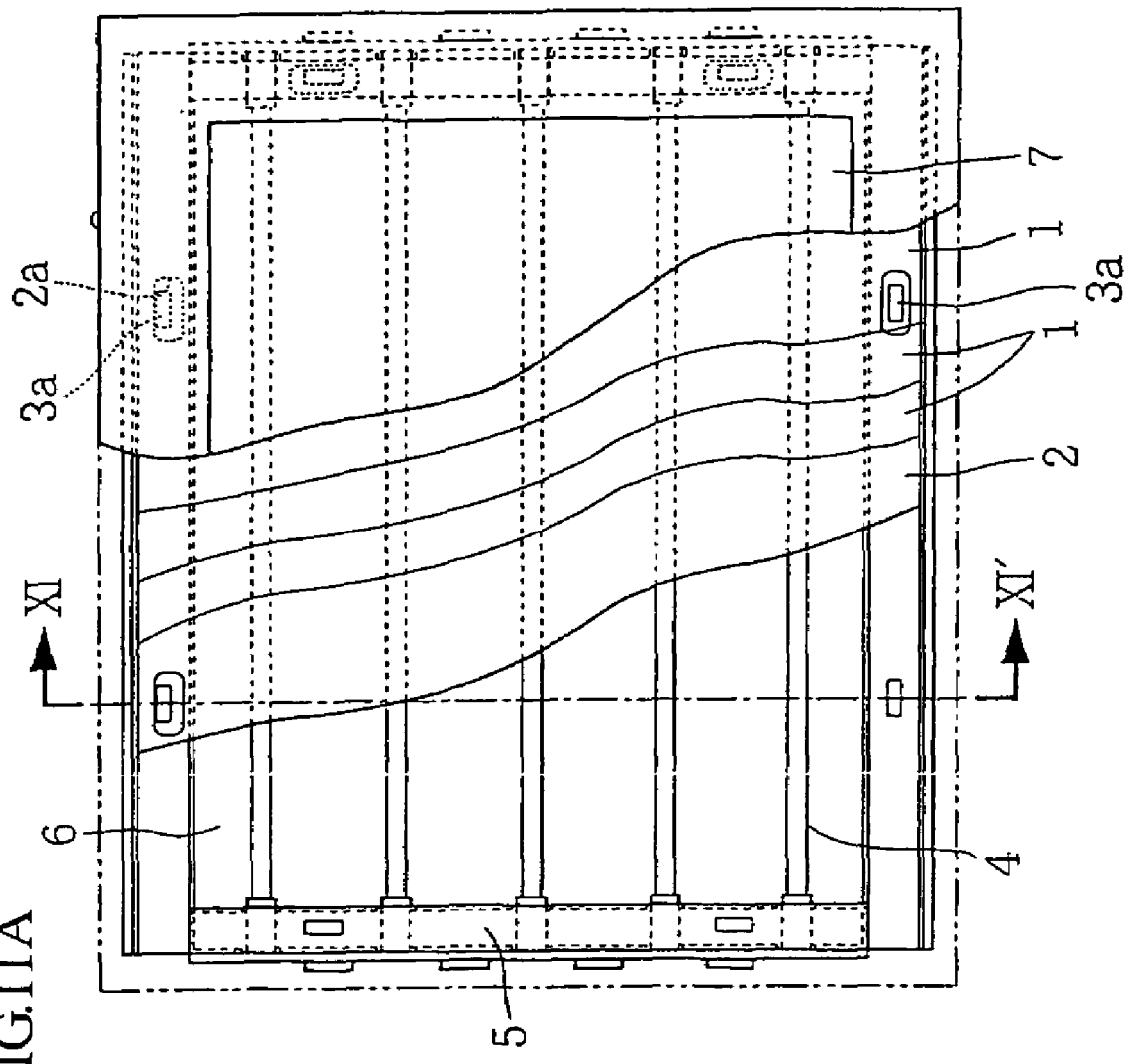
FIG. 11(A) shows a front view of the LCD backlight apparatus shown in FIG. 10.
Figure 11B:
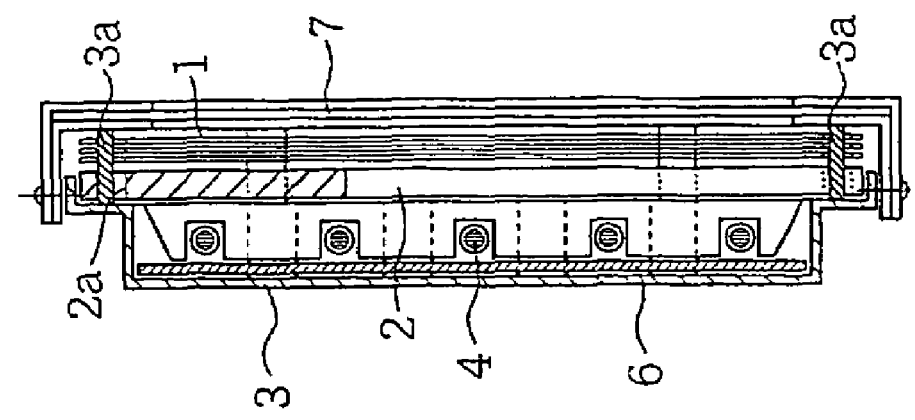
FIG. 11(B) shows a cross-sectional view taken along line XI-XI of FIG. 11(A).

Hereafter, the LCD backlight apparatus according to a second embodiment of the invention will be described by referring to FIGS. 10 to 11(B). As the size of the LCD increases, so does the size of the optical sheets 1 and the diffusing plate 2, resulting in an increase in their weight. However, as the optical members such as the optical sheets are made of plastic, there is a limit to their mechanical strength. Thus, the openings formed in these members could be deformed by the weight of the members.

Therefore, it is necessary to design the openings such that they can withstand the stress caused by the members in which they are provided. This is achieved by increasing the area of contact between the openings 2a formed in the optical sheets 1 or diffusing plate 2 and the locking projections 3a. Specifically, the abutting portions of the openings 2a and the locking projections 3a are elongated along the side (horizontally). As described above, in the LCD backlight apparatus according to the embodiments of the invention, the diffusing plate 2 is locked by the locking projections located at the upper end of the shield 3. As a result, the upper edge of the openings of the diffusing plate 2 is subject to stress corresponding to the weight of the diffusing plate. Therefore, by increasing the length of the openings 2a and the locking projections 3a at the top along a direction (along the side) perpendicular to the direction of application of the weight of the diffusing plate, the area of contact between the openings 2a and the locking projections 3a can be increased.

In this structure, the stress due to the weight of the diffusing plate 2 applied to the upper edge of the openings 2a can be distributed over an extensive contact plane, so that the deformation of the optical members caused by their own stress can be prevented. Desirably, the locking projections and the openings at the bottom should also be configured in a similar manner so as to increase their area of contact, as the lower edges of the openings would be subject to a similar stress when the LCD apparatus (LCD backlight apparatus) is rotated by 180° (turned upside-down), for example, in the display plane.

The openings and locking projections on the left and right sides with respect to the normal orientation (basic position) can be considered in a similar manner when the LCD apparatus is rotated by 90° in the display plane. Specifically, the area of contact between the openings 2a and locking projections 3a can be increased by elongating them in a vertical direction in the basic position (along the left and right sides), so that the stress put on the optical members can be distributed.

Hereafter, a third embodiment of the LCD backlight apparatus according to the invention will be described by referring back to FIG. 1. The measurements of the diffusing plate 2 also vary depending on its state of water absorption, namely the degree of humidity around it. The maximum amount of water absorption of the diffusing plate 2 (saturation water absorption) tends to increase with respect to humidity. Saturation water absorption also has a positive correlation with the elongation of the diffusing plate 2. Thus, it must be estimated how much the diffusing plate 2 would be extended under maximum humidity conditions from its measurements under normal humidity conditions. Calculations for this purpose will be hereafter described by referring to FIGS. 17 and 18.

Figure 17:
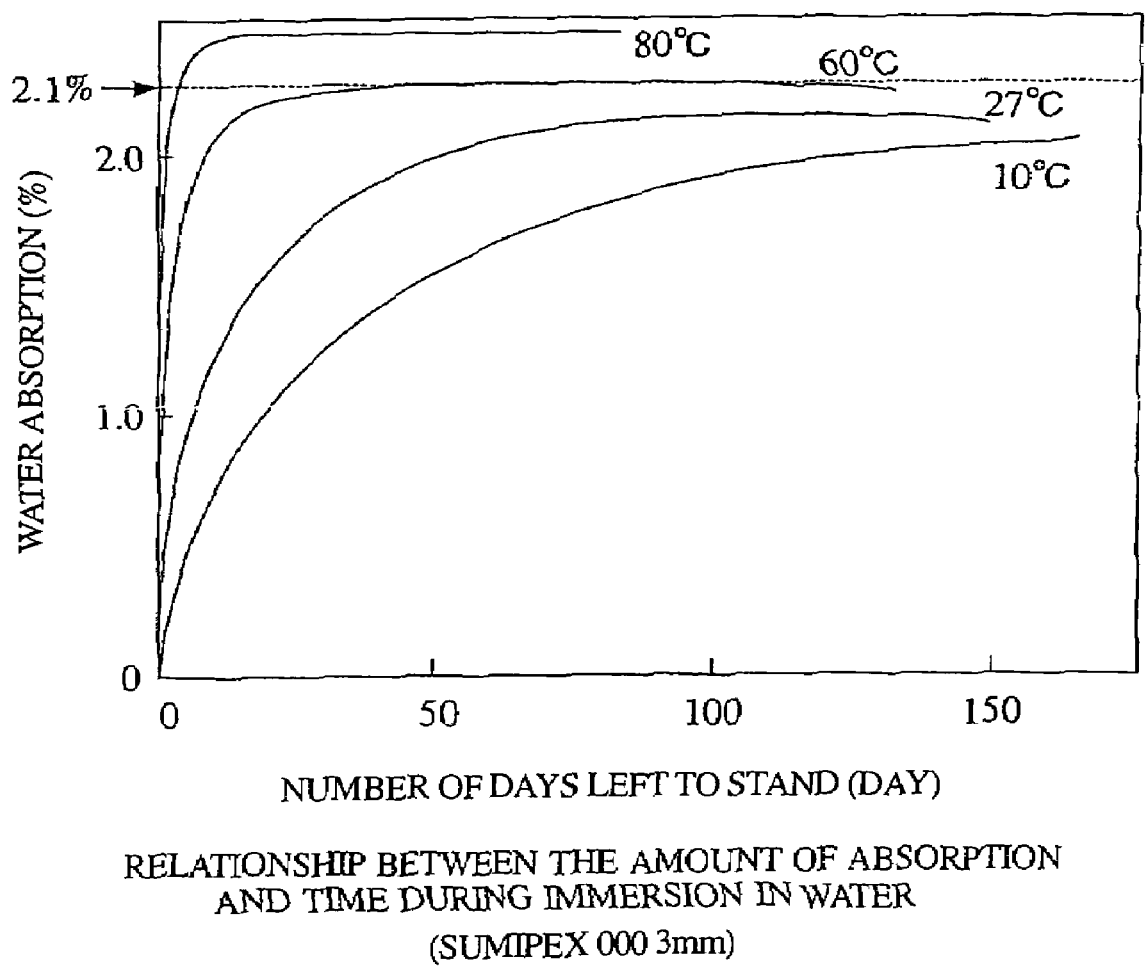
FIG. 17 shows the relationship between the number of days an optical member was left immersed in water and the water absorption ratio.

The influence of humidity on the diffusing plate 2 will be described by referring to FIGS. 17 and 18. FIG. 17 shows an example of experimental data concerning the relationship between the number of days in which the diffusing plate 2 was left immersed in water and the water absorption ratio. FIG. 18 shows the relationship between the saturation absorption ratio and the length-increase ratio of the diffusing plate 2. Assuming the maximum temperature of the LCD backlight is 60° C., the absorption of the diffusing plate is determined to be 2.1% from FIG. 17. The length-increase ratio at absorption 2.1% is determined to be 0.45% from FIG. 18. Thus, the increase in the interval of the left and right openings in the diffusing plate 2 can be calculated by the below-indicated equation. In reality, it is unlikely that the diffusing plate would be immersed in water. However, given the possibility of using the LCD apparatus in a very humid environment continuously for an extended period of time, a length-increase ratio of 0.45% would correspond to a worst-case assumption and can be therefore considered sufficient from design perspective. Thus, the following equation can be introduced:

$$\Delta L = 200 \text{ mm} \times 0.45/100 = 0.9 \text{ mm}$$

In other words, in order to overcome the stress due to the weight of the diffusing plate itself, a gap of the order of 0.9 mm must be given between the opening in the diffusing plate 2 and the locking projection when taking extension due to humidity into consideration. The same can be applied to the vertical direction.

More specifically, the diffusing plate 2 must be designed taking the two factors of thermal expansion and moisture absorption into consideration. In general, the extension of the diffusing plate 2 due to moisture absorption and its thermal expansion can be independently considered. Thus, the extension caused by temperature change and that caused by humidity change can be added together, and the resultant value can be used for the gap between the edge of the opening and the periphery of the locking projection. An example of the method for this calculation will be described below.

It is now assumed that the temperature of the diffusing plate 2 has increased from 20° C. (room temperature) to 60° C. after the diffusing plate 2 that had absorbed water to a saturation absorption level was assembled in a panel module and the LCD apparatus was turned on. These conditions are the same as the two above-described conditions, and they can be approximated by the sum of the two calculation results. Namely, the sum of the extension caused by thermal change and that caused by humidity for the 200 mm opening interval can be calculated by ΔL=0.6 mm+0.9 mm=1.5 mm The same estimation can be made for the vertical direction as well. Based on these estimates, the positions of the openings can be designed.

Hereafter, the LCD backlight apparatus according to a fourth embodiment of the invention will be described by referring to FIG. 12.

As described above, the plastic diffusing plate 2 might be warped toward the LCD panel due to its water absorption or thermal expansion ratios combined with the thermal or humidity environments inside the backlight even if its own weight does not have any influence. If such warping becomes excessive, the protruding portion of the diffusing plate can come into contact with part of the LCD panel via the optical sheets 1, causing temperature irregularities to show on the entire LCD panel. These temperature irregularities may in turn produce luminance irregularities on the entire panel screen. Thus, in order to prevent such warping of the diffusing plate toward the LCD panel, a stopper 8 in the shape of a bracket or ko (「コ」 Japanese character (KATAKANA)) shape, for example, is used. The stopper 8 should desirably be attached at such a position that it can hold each locking projection 3a inner surface of the ko 「コ」 character shape, between its two legs in the direction corresponding to the thickness of the panel.

In this way, the diffusing plate's degree of spatial freedom in the direction corresponding to thickness can be restricted without causing stress on the diffusing plate 2 or the optical sheets 1 in the direction corresponding to thickness. Thus, even if the diffusing plate 2 is warped toward the LCD panel, the possibility of the plate's coming into contact with the LCD panel can be minimized. Preferably, instead of the ko 「コ」 character-shaped stopper 8, an L-shaped one that comes into contact with the optical members on the LCD panel side but not with their back may be used. By using such an L-shaped stopper, the optical members can be prevented from warping toward the LCD panel even if they are warped.

Hereafter, a fifth embodiment of the LCD backlight apparatus according to the invention will be described. In this embodiment, the diffusing plate is provided with an antistatic function. The diffusing plate with an antistatic function is produced by mixing an antistatic agent during the manufacture (in the polymerization step) of the diffusing plate. This feature prevents the contamination of the diffusing plate by impurities during its storage and assembly into a module, so that the deterioration of its quality due to the adhesion of dust or dirt can be prevented.

Figure 13:
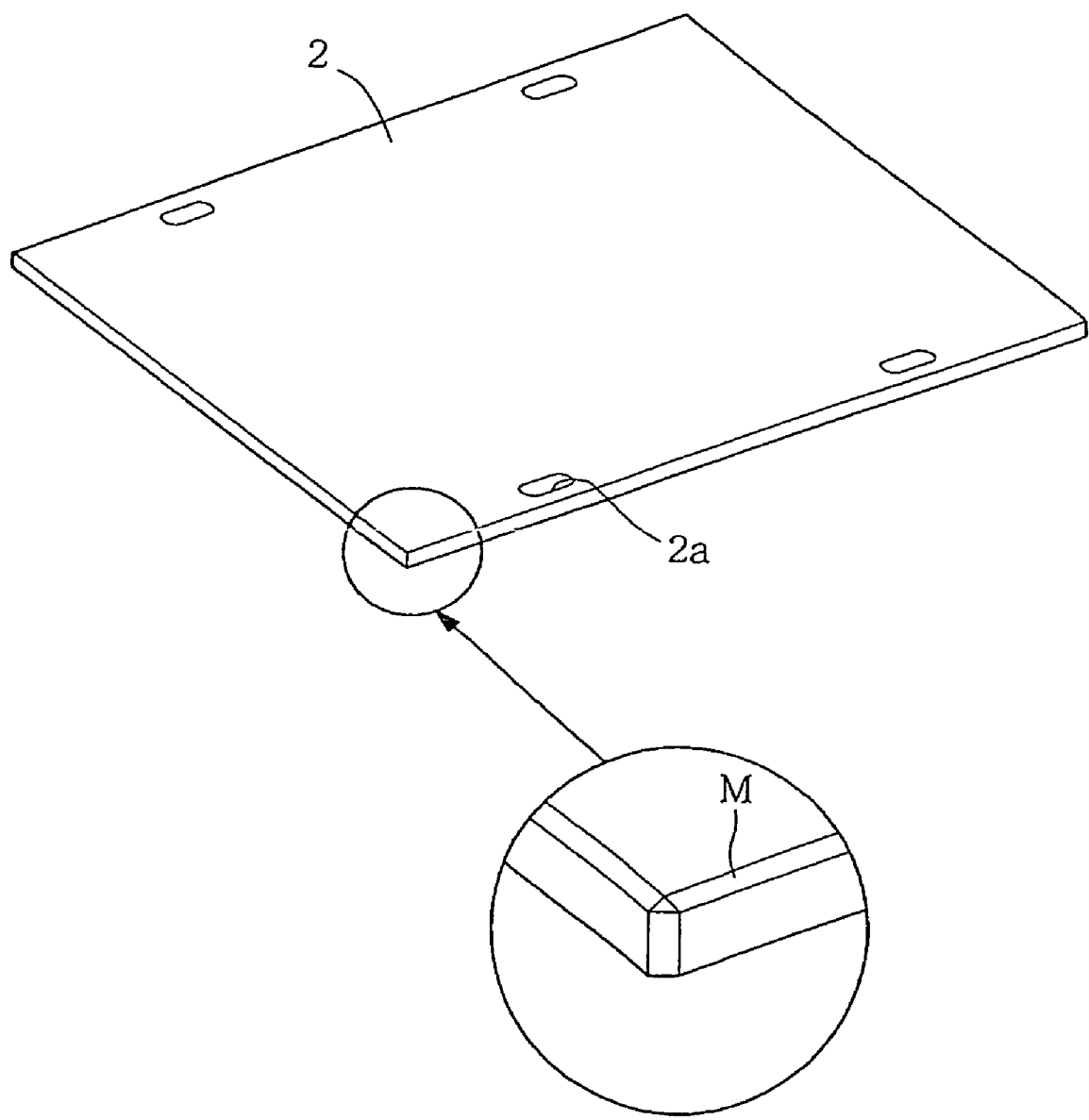
FIG. 13 shows an example of an optical member (diffusing plate) in the LCD backlight apparatus according to a fourth embodiment of the invention.
Figure 14:
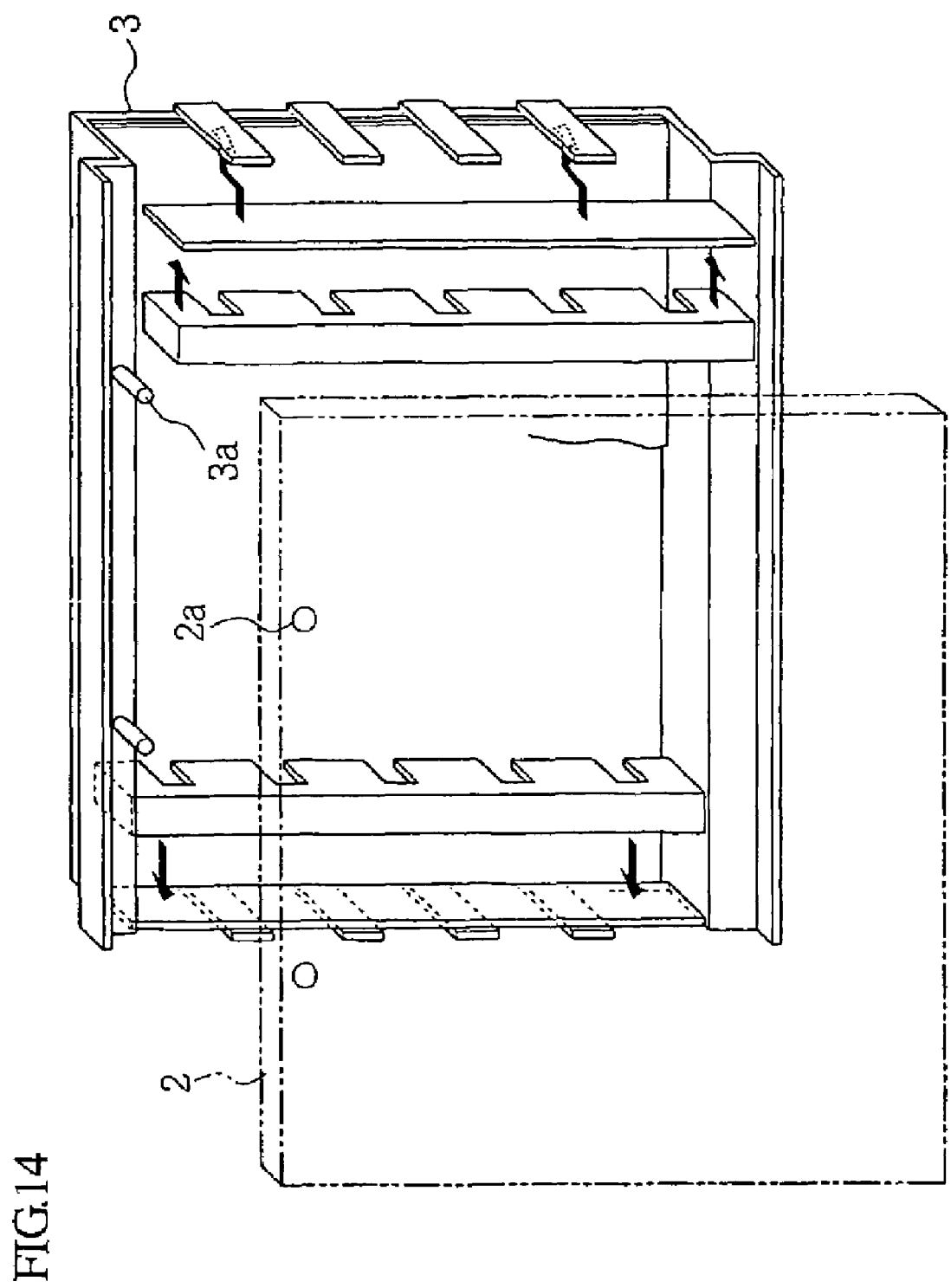
FIG. 14 shows a broken perspective view of a conventional LCD backlight apparatus.
Figure 15A:
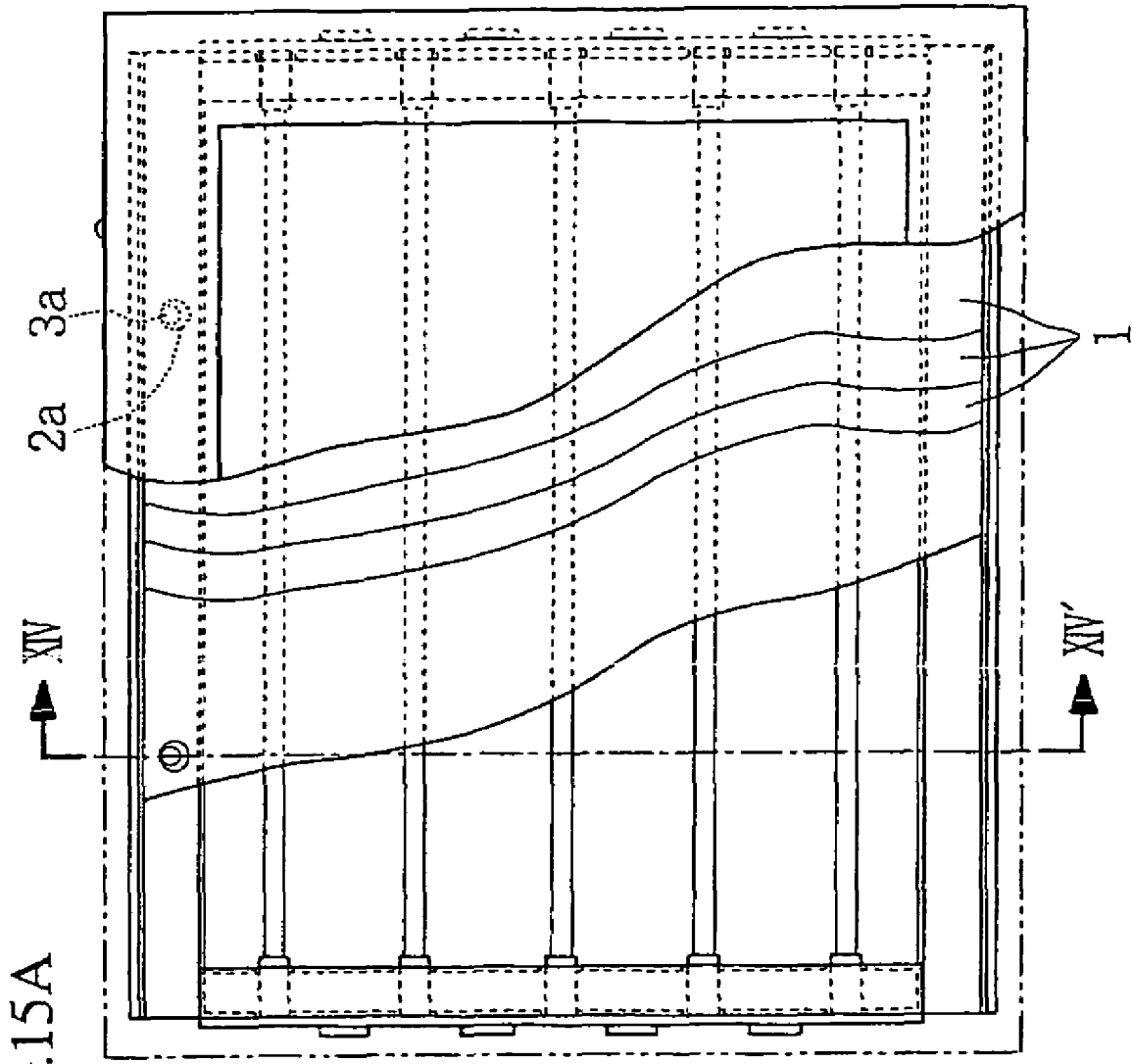
FIG. 15(A) shows a front view of the LCD backlight apparatus shown in FIG. 14.
Figure 15B:
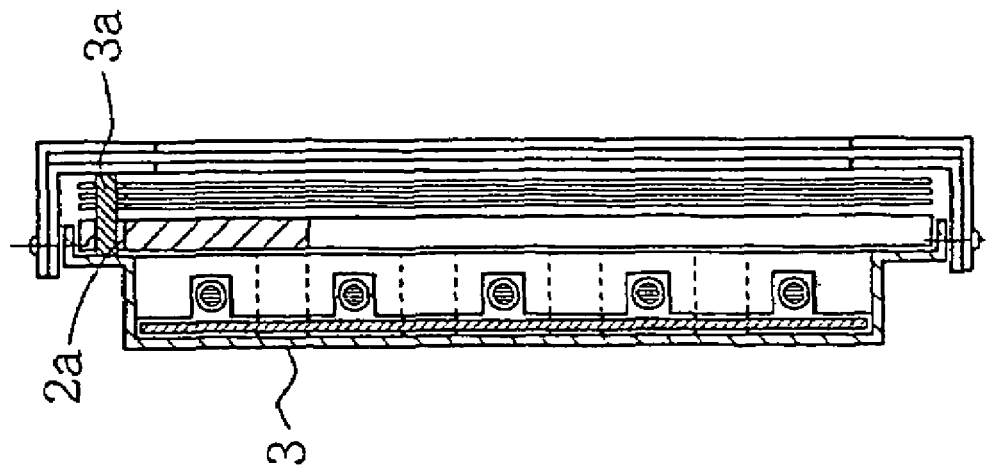
FIG. 15(B) shows a cross-sectional view taken along line XV-XV of FIG. 15(A).

Hereafter a method of manufacturing the LCD backlight apparatus according to a sixth embodiment of the invention will be described. FIG. 13 shows an example of the diffusing plate in the present embodiment. The direct backlight apparatuses are often used in large-sized displays. In the case of apparatuses using an optical guide plate, the weight problem is pronounced. Specifically, as the size of the edge-lighting type backlight apparatus increases, so must the optical guide plate be increased in thickness, thus increasing its weight. In contrast, a direct backlight apparatus can maintain its strength by the surrounding structures, thus requiring less thickness than an apparatus using an optical guide plate even when increased in size. Thus, direct backlight apparatuses can be increased in size while reducing their weight.

However, the ease of handling of direct backlight apparatuses could also suffer, particularly when they have large sizes. For example, the level of safety during operation might drop, or the productivity might be compromised. Accordingly, in the present embodiment, the edges and sides of the diffusing plate are beveled. By thus forming beveled portions M, the diffusing plates can be handled safely and speedily by those who manufacture them, thus increasing the quality of the products.

Advantages of the LCD backlight apparatus according to the various embodiments of the invention are as follows. The size of the backlight apparatus in LCD apparatuses can be increased, because the warping of the optical diffusing sheets due to their own weights can be prevented. The influence of the weight of the optical sheets or diffusing plate on themselves can be reduced when the display apparatus is rotated by 180° or 90° in the display plane, so that the warping of those optical members by their own weights can be prevented. By supporting the optical members using the openings and locking projections at the top instead of at the bottom, the stress applied to the openings by the weight of the optical members can be reduced, so that the deformation of such members due to the stress applied to their openings can be prevented. The problems caused by thermal expansion and/or water absorption in the optical sheets or diffusing plate can be prevented.

By holding the optical members by ko 「コ」 character-shaped or L-shaped stoppers at their edges, the warping of the optical members toward the LCD panel can be prevented. By providing the diffusing plate with an antistatic function, the adhesion of dust or dirt on the optical members due to their static can be prevented. By beveling the edges or sides of the diffusing plate, the plate can be made safer to handle, thus contributing to the improvement in its reliability and quality.

While in the various embodiments of the invention as described above the openings are formed in the optical members and the locking portion are formed in the frame (lamp holder), the openings may be formed in the frame and the locking projections in the optical members. The invention can also be applied to relatively small-sized lighting or LCD apparatuses of the light-guiding plate type (or an edge-lighting type where light sources are disposed on either side of the light-guiding plate). The backlight apparatus may be provided with a known rotating mechanism so that it can be rotated and stopped at arbitrary angles, rather than at fixed angles (such as at 90° intervals) as described above. Further, instead of or together with the rotation in the display plane, the lighting or backlight apparatus according to the invention may be allowed to be rotated about an axis including and intersecting the screen. In this case, too, it is desirable that the optical members be supported above their center of gravity so that their warping can be prevented at any rotation position, as described in the embodiments.

It should be obvious to those skilled in the art that variations, modifications or combinations are possible.

INDUSTRIAL APPLICABILITY

Thus, in accordance with the invention, the optical members such as optical sheets and diffusing plate in the lighting or LCD backlight apparatus can be locked when the entire display is rotated about an axis normal to the screen plane.

Further, the warping of such optical members due to their own weight can be prevented. The warping of the optical members can be prevented under various environments by taking into consideration the thermal expansion or other properties of the optical members.

Thus, clear display can be realized with few luminance irregularities.

The invention claimed is:

1. A lighting apparatus, comprising:
   an optical member; and
   a plurality of locking portions, wherein,
   a light emitting plane of the optical member is parallel to a vertical direction and at least one opening is provided in each of four regions of the optical member that are demarcated by a line parallel to the vertical direction that passes through the center of gravity of the light emitting plane of the optical member and a line parallel to a horizontal direction that passes through the center of gravity,
   in each of the four regions, a locking portion penetrates a corresponding opening,
   regardless of which two adjacent regions of the four regions are positioned vertically above with respect to the center of gravity when the lighting apparatus is set, the optical member is suspended by the locking portion penetrating the corresponding opening in a vertically upper and horizontally left region with respect to the center of gravity, and by the locking portion penetrating the corresponding opening in a vertically upper and horizontally right region with respect to the center of gravity, as an upper peripheral portion of each locking portion abuts on an upper-edge portion of the corresponding opening, and
   in a vertically lower side with respect to the center of gravity of the optical member, each of the locking portions penetrates the corresponding opening such that the optical member is not subjected to the stress caused by its own weight in the vertically upward direction, nor is it subjected to the stress caused by its contact in the vertically downward direction with the locking portion.

2. The lighting apparatus according to claim 1, wherein, regardless of which two adjacent regions of the four regions are located above with respect to the center of gravity when the lighting apparatus is set, in a lower side with respect to the center of gravity of the optical member, said each of the locking portions penetrates the corresponding opening in a contactless manner.

3. An LCD apparatus comprising the lighting apparatus of claim 1 and an LCD panel.

4. A lighting apparatus comprising:
   an optical member having a plurality of openings; and
   a plurality of locking portions,
   the lighting apparatus comprising at least four sets of the opening and the locking portion that penetrates the opening, wherein,
   either in a basic position of the lighting apparatus in which a light emitting plane of the optical member is parallel with a vertical direction, or in a first stop position thereof that is taken when the lighting apparatus is rotated from the basic position in the plane of the optical member while the light emitting plane of the optical member remains parallel to a vertical direction, the optical member is suspended by at least one of the sets of the opening and the locking portion that penetrates the opening, as they are engaged with one another in a vertically upper side with respect to the center of gravity of the optical member, and
   in a vertically lower side with respect to the center of gravity of the optical member, each of the locking portions penetrates a corresponding opening such that the optical member is not subjected to the stress caused by its own weight in the vertically upward direction, nor is it subjected to the stress caused by its contact in the vertically downward direction with the locking portion.

5. The lighting apparatus according to claim 4, wherein, either in the basic position of the lighting apparatus or in the first stop position, the optical member is disposed in a state such that the opening and the locking portion do not come into contact with one another in a vertically lower side with respect to the center of gravity of the optical member.

6. The lighting apparatus according to claim 5, wherein the state such that the opening and the locking portion are not in contact with one another is a state such that, when the lighting apparatus is used in an LCD display apparatus, the optical member is given a degree of spatial freedom within the range of the expansion of the optical member that is caused by thermal expansion and/or absorption of moisture in the optical member within the normal range of use of the LCD apparatus.

7. The lighting apparatus according to claim 4, wherein, either in the basic position or in the first stop position, the opening is shaped longer in the left-right direction than in the vertical direction with respect to the center of gravity in the upper side of the optical member in the vertical direction with respect to the center of gravity, wherein the locking portion that engages with the opening has its upper peripheral portion come into contact with the opening in a longitudinal direction of the opening.

8. The lighting apparatus according to claim 4, wherein the first stop position is a position that is taken when the lighting apparatus is rotated by 90° from the basic position in the plane of the optical member while the light emitting plane of the optical member remains parallel with the vertical direction.

9. The lighting apparatus according to claim 4, wherein the first stop position is a position that is taken when the lighting apparatus is rotated by 180° from the basic position in the plane of the optical member while the light emitting plane of the optical member remains parallel with the vertical direction.

10. The lighting apparatus according to claim 4, wherein the surface of the optical member is provided with an antistatic finish.

11. The lighting apparatus according to claim 4, wherein at least a corner or a side of the optical member is chamfered.

12. An LCD apparatus comprising the lighting apparatus of claim 4 as a backlight apparatus, and an LCD panel as a display unit.

13. The LCD apparatus according to claim 12, further comprising a rotating mechanism for rotating the display unit.

14. A lighting apparatus comprising:
   an optical member having a plurality of cutout portions; and
   a plurality of locking portions associated with the cutout portions, wherein,
   a light emitting plane of the optical member is parallel with a vertical direction, the cutout portions are formed in the each end-sides of the optical member at the top, bottom, left, and right of the optical member with respect to the center of gravity of the light emitting plane, such that the cutout portions can be engaged with the locking portions, and regardless of which of the top, bottom, left, and right end-sides comes at the top when the lighting apparatus is set, the optical member is supported by an upper internal edge of each of the cutout portions in the left and right end-sides of the optical member abutting on the locking portion adapted to be engaged with the cutout portion.

15. The lighting apparatus according to claim 14, wherein, in cases where the light emitting plane of the optical member is parallel with the vertical direction, at least one of the cutout portions formed in both left and right sides horizontally of the optical member is disposed in a vertically upper side with respect to the center of gravity of the optical member.

16. The lighting apparatus according to claim 14, wherein, both in a basic position of the lighting apparatus where a light emitting plane of the optical member is parallel with a vertical direction, and in a first stop position that is taken when the lighting apparatus is rotated from the basic position in the plane of the optical member while the light emitting plane of the optical member remains parallel with the vertical direction, the optical member is supported by an upper internal edge of each of the cutout portions in the both end-sides that are positioned in the horizontal direction in the optical member abutting on the locking portion adapted to be engaged with the cutout portion.

17. An LCD apparatus comprising the lighting apparatus of claim 14 and an LCD panel.

* * * * *